(12) United States Patent
Hakumura et al.

(10) Patent No.: US 8,812,184 B2
(45) Date of Patent: Aug. 19, 2014

(54) CONTROL DEVICE

(75) Inventors: Yomei Hakumura, Toyokawa (JP);
Yoichi Tajima, Anjo (JP); Hirokazu Kobayashi, Obu (JP); Arinori Shimada, Nishio (JP)

(73) Assignee: Aisin Aw Co., Ltd., Anjo (JP)

( * ) Notice: Subject to any disclaimer, the term of this patent is extended or adjusted under 35 U.S.C. 154(b) by 76 days.

(21) Appl. No.: 13/238,866

(22) Filed: Sep. 21, 2011

(65) Prior Publication Data

US 2012/0078456 A1  Mar. 29, 2012

(30) Foreign Application Priority Data

Sep. 29, 2010 (JP) .................................. 2010-219933

(51) Int. Cl.
| | |
|---|---|
| *B60L 9/00* | (2006.01) |
| *B60L 11/00* | (2006.01) |
| *G05D 1/00* | (2006.01) |
| *B60W 10/06* | (2006.01) |
| *B60L 3/00* | (2006.01) |
| *B60W 10/08* | (2006.01) |
| *B60W 10/115* | (2012.01) |
| *B60W 10/02* | (2006.01) |
| *B60W 30/20* | (2006.01) |
| *B60W 30/188* | (2012.01) |
| *B60L 11/14* | (2006.01) |

(52) U.S. Cl.
CPC .............. *B60W 10/02* (2013.01); *B60W 10/06* (2013.01); *B60L 2240/36* (2013.01); *B60L 3/003* (2013.01); *B60W 2710/083* (2013.01); *Y02T 10/7241* (2013.01); *B60W 2710/025* (2013.01); *B60L 2210/40* (2013.01); *B60W 10/08* (2013.01); *B60W 2710/081* (2013.01); *B60W 10/115* (2013.01); *Y02T 10/7077* (2013.01); *B60W 2710/1005* (2013.01); *B60L 2240/443* (2013.01); *B60W 2710/0644* (2013.01); *B60W 30/20* (2013.01); *B60L 2240/441* (2013.01); *B60L 3/0061* (2013.01); *B60W 2710/0666* (2013.01); *B60W 30/188* (2013.01); *B60L 11/14* (2013.01); *B60L 2270/145* (2013.01)
USPC ............................ 701/22; 701/54; 123/192.1

(58) Field of Classification Search
USPC ............... 701/22, 51, 55, 67, 82, 104, 36, 54; 123/179.4, 192.1, 90.15, 406.29, 123/568.11, 568.21; 180/65.22, 65.25, 180/65.26, 65.265; 318/140, 371, 432, 611; 475/5, 56, 65; 477/110, 130, 174, 175, 477/176, 181, 5; 60/278, 284; 290/40 C
See application file for complete search history.

(56) References Cited

U.S. PATENT DOCUMENTS 6,380,640 B1 * 4/2002 Kanamori et al. .......... 290/40 C
6,621,244 B1 * 9/2003 Kiyomiya et al. ............ 318/611
(Continued)

FOREIGN PATENT DOCUMENTS

| JP | A-2006-002740 | 1/2006 |
|---|---|---|
| JP | A-2009-274601 | 11/2009 |

(Continued)

OTHER PUBLICATIONS

Feb. 2, 2011 Search Report issued in International Application No. PCT/JP2011/072027.

*Primary Examiner* — Tuan C. To
*Assistant Examiner* — Isaac Smith
(74) *Attorney, Agent, or Firm* — Oliff PLC

(57) ABSTRACT

A control device configured with a vibration reduction necessity determination section that determines whether or not a required drive operation point falls within a reduction necessary range, which is prescribed in advance as a range in which it is necessary to reduce torque vibration transferred from the internal combustion engine to the rotary electric machine. A cancellation control execution determination section that determines whether or not torque vibration cancellation control can be executed in the case where it is determined that the required drive operation point falls within the reduction necessary range. An execution control decision section that decides to execute the torque vibration cancellation control in the case where it is determined that the torque vibration cancellation control can be executed and that decides to execute operation point change control in the case where it is determined that the torque vibration cancellation control cannot be executed.

5 Claims, 15 Drawing Sheets

(56) References Cited

U.S. PATENT DOCUMENTS 7,073,616 B2 *  7/2006  Itoh et al. ................... 180/65.25
2009/0145381 A1 *  6/2009  Watanabe ................. 123/90.15

FOREIGN PATENT DOCUMENTS

JP    A-2009-298266    12/2009
JP    A-2010-138751    6/2010

* cited by examiner

US 8,812,184 B2

CONTROL DEVICE

INCORPORATION BY REFERENCE

The disclosure of Japanese Patent Application No. 2010-219933 filed on Sep. 29, 2010 including the specification, drawings and abstract is incorporated herein by reference in its entirety.

BACKGROUND OF THE INVENTION

The present invention relates to a control device that controls a vehicle drive device in which a rotary electric machine is provided on a power transfer path connecting between an input member drivably coupled to an internal combustion engine and an output member drivably coupled to wheels.

DESCRIPTION OF THE RELATED ART

A drive range of an internal combustion engine includes a high-vibration range in which torque vibration output from the internal combustion engine is significant. In the high-vibration range, the torque vibration may be transferred to a drive device for a vehicle to produce a muffled sound, causing a discomfort to a driver. Japanese Patent Application Publication No. 2010-138751 mentioned below, for example, discloses a technique related to the high-vibration range described below. That is, in the technique according to Japanese Patent Application Publication No. 2010-138751, control in which an operation line of an internal combustion engine is set on the basis of the amount of torque vibration is performed in order to avoid the high-vibration range. In the technique according to Japanese Patent Application Publication No. 2010-138751, the operation line is set so as to minimize deterioration of the fuel efficiency.

In the technique according to Japanese Patent Application Publication No. 2010-138751, however, it is necessary to change the operation point of the internal combustion engine from an operation line along which the fuel efficiency is optimum in order to avoid the high-vibration range, inevitably accordingly deteriorating the fuel efficiency. Thus, there is room for improvement from the viewpoint of improving the fuel efficiency.

SUMMARY OF THE INVENTION

Thus, there has been desired a control device for a vehicle drive device capable of improving the fuel efficiency while reducing a discomfort caused to a driver.

According to a first aspect of the present invention, a control device controls a vehicle drive device in which a rotary electric machine is provided on a power transfer path connecting between an input member drivably coupled to an internal combustion engine and an output member drivably coupled to wheels The control device includes; a vibration reduction necessity determination section that determines whether or not a required drive operation point, which is a drive operation point defined on the basis of output torque and a rotational speed required for the internal combustion engine, falls within a reduction necessary range, which is prescribed in advance as a range in which it is necessary to reduce torque vibration transferred from the internal combustion engine to the rotary electric machine; a cancellation control execution determination section that determines whether or not torque vibration cancellation control, in which the rotary electric machine is caused to output torque for canceling the torque vibration, can be executed in the case where it is determined that the required drive operation point falls within the reduction necessary range; and an execution control decision section that decides to execute the torque vibration cancellation control in the case where it is determined that the torque vibration cancellation control can be executed and that decides to execute operation point change control, in which the drive operation point of the internal combustion engine is changed, in the case where it is determined that the torque vibration cancellation control cannot be executed.

The term "rotary electric mach*" as used herein refers to any of a motor (electric motor), a generator (electric generator), and a motor generator that functions both as a motor and as a generator as necessary.

The term "drivably coupled" as used herein refers to a state in which two rotary elements are coupled to each other in such a way that enables transfer of a drive force, which includes a state in which the two rotary elements are coupled to each other to rotate together with each other, and a state in which the two rotary elements are coupled to each other via one or two or more transmission members in such a way that enables transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

According to the first aspect of the present invention, in the case where it is determined that the torque vibration cancellation control can be executed, the torque vibration cancellation control is executed. Thus, the torque vibration transferred to the side of the wheels with respect to the rotary electric machine can be reduced to reduce a discomfort caused to a driver. Therefore, in the case where the required drive operation point of the internal combustion engine falls within the reduction necessary range and within a high-efficiency range in which the thermal efficiency of the internal combustion engine is high, the internal combustion engine can be positively driven in the reduction necessary range to improve the fuel efficiency. Therefore, the fuel efficiency can be improved and a discomfort caused to the driver can be reduced at the same time.

In the case where it is determined that the torque vibration cancellation control cannot be executed, on the other hand, the operation point change control in which the drive operation point of the internal combustion engine is changed is executed. Thus, it is possible to reduce the torque vibration transferred from the internal combustion engine and to reduce a discomfort caused to the driver without executing the torque vibration cancellation control.

Thus, the fuel efficiency can be improved by performing appropriate control in accordance with whether or not the torque vibration cancellation control can be executed, while reducing a discomfort caused to the driver.

According to a second aspect of the present invention, the rotary electric machine may be electrically connected to a power storage device via an inverter that performs a DC/AC conversion, and the cancellation control execution determination section may determine whether or not the torque vibration cancellation control can be executed on the basis of a state of at least one of the rotary electric machine, the power storage device, and the inverter.

According to the second aspect of the present invention, it is determined whether or not the torque vibration cancellation control can be executed on the basis of the state of at least one of the rotary electric machine, the power storage device, and the inverter. Thus, it is possible to improve the accuracy of determination as to whether or not it is possible to cause the rotary electric machine to output torque with a magnitude enough to cancel the torque vibration. For example, it is possible to accurately determine, on the basis of the temperature and the charge amount of the power storage device, whether or not the power storage device can supply electric power enough to execute the torque vibration cancellation control. In the case where the rotary electric machine is caused to execute the torque vibration cancellation control, it is possible to accurately determine, on the basis of the temperature of the rotary electric machine or the temperature of the inverter, whether or not the temperature of the rotary electric machine or the inverter may become too high.

According to a third aspect of the present invention, the reduction necessary range may be a range prescribed using both the rotational speed and the output torque of the internal combustion engine.

The amplitude of the output torque vibration output from the internal combustion engine is proportional to the magnitude of the output torque (average value) of the internal combustion engine, and the frequency of the output torque vibration is proportional to the rotational speed of the internal combustion engine. The characteristics of torque transfer from the internal combustion engine to the rotary electric machine are varied in accordance with the frequency of the output torque vibration. Therefore, the torque vibration transferred from the internal combustion engine to the rotary electric machine is varied in accordance with the rotational speed and the output torque of the internal combustion engine. Therefore, it is possible to appropriately prescribe a range of the drive operation point of the internal combustion engine in which it is necessary to reduce the torque vibration by prescribing the reduction necessary range using both the rotational speed and the output torque of the internal combustion engine.

According to a fourth aspect of the present invention, the vehicle drive device may include an automatic speed change mechanism capable of changing a speed ratio and a friction engagement device capable of adjusting a state of transfer of rotation, the automatic speed change mechanism and the friction engagement device being provided on the power transfer path, and the operation point change control may be at least one of speed ratio change control, in which the speed ratio is changed to vary the rotational speed of the internal combustion engine, and slip control, in which the friction engagement device is brought into a slip state.

According to the fourth aspect of the present invention, in the speed ratio change control, the speed ratio of the automatic speed change mechanism is changed to vary the rotational speed of the internal combustion engine with respect to the rotational speed of the output member. Thus, the drive operation point of the internal combustion engine can be varied in the direction of moving out of the reduction necessary range. Therefore, the torque vibration transferred from the internal combustion engine can be reduced.

In the slip control, in addition, the friction engagement device provided on the power transfer path is brought into the slip state. Thus, the torque vibration transferred from the friction engagement device to the side of the wheels can be reduced. Also in the speed ratio change control, the rotational speed of the internal combustion engine is varied with respect to the rotational speed of the output member. Thus, the drive operation point of the internal combustion engine can be varied in the direction of moving out of the reduction necessary range. Therefore, the torque vibration transferred from the internal combustion engine can be reduced.

According to a fifth aspect of the present invention, the execution control decision section may select, as the operation point change control, one of the speed ratio change control and the slip control that causes a smaller reduction in energy efficiency of the vehicle drive device on the basis of the drive operation point of the internal combustion engine and the rotational speed of the output member, and decides to execute the selected control.

According to the fifth aspect of the present invention, one of the control schemes that causes a smaller reduction in energy efficiency is selected even in the case where the operation point change control is executed, suppressing deterioration of the fuel efficiency.

BRIEF DESCRIPTION OF THE DRAWINGS

FIGS. 13A, 13B and 13C illustrate an amplitude decider according to the embodiment of the present invention, in which FIG. 13A is a block diagram showing the configuration of the amplitude decider, FIG. 13B is a characteristics map for the output torque amplitude, and FIG. 13C is a characteristics map for a transfer mechanism gain;

FIGS. 14A and 14B show Bode diagrams of the power transfer system according to the embodiment of the present invention, in which FIG. 14A shows the characteristics of transfer from output torque of an engine to the rotational speed of the rotary electric machine, and FIG. 14B shows the torque transfer characteristics of a first power transfer mechanism.

DETAILED DESCRIPTION OF THE EMBODIMENTS

Figure 1:
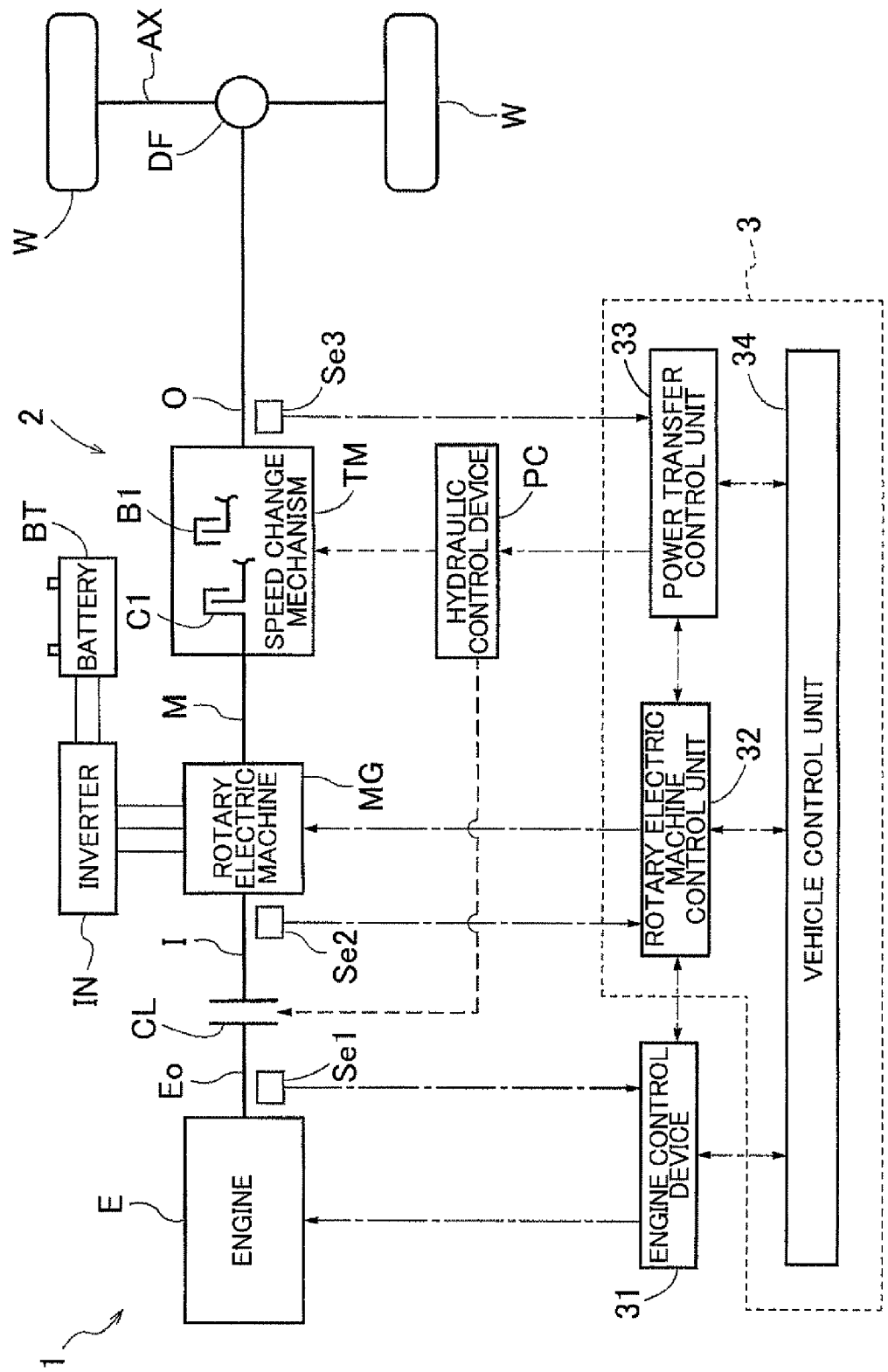
FIG. 1 is a schematic diagram showing a schematic configuration of a vehicle drive device and a control device according to an embodiment of the present invention.

A control device 3 according to an embodiment of the present invention will be described with reference to the drawings. FIG. 1 is a schematic diagram showing a schematic configuration of a vehicle drive device 1 according to the embodiment. As shown in the drawing, a vehicle incorporating the vehicle drive device 1 is a hybrid vehicle including an engine E, which is an internal combustion engine, and a rotary electric machine MG each serving as a drive force source for the vehicle. In the drawing, the solid lines each indicate a drive force transfer path, the broken lines each indicate a working oil supply path, and the dash-dotted lines each indicate a signal transfer path. In the embodiment, the control device 3 is a device that controls the vehicle drive device 1 in which the rotary electric machine MG is provided on a power transfer path 2 connecting between an input shaft I drivably coupled to the engine E and an output shaft O drivably coupled to wheels W. In the embodiment, the power transfer path 2 includes an engine separation clutch CL which is a friction engagement device capable of adjusting the state of transfer of rotation. The engine separation clutch CL drivably couples and decouples the rotary electric machine MG and the engine E to and from each other (that is, maintains and releases coupling between the rotary electric machine MG and the engine E). The power transfer path 2 also includes a speed change mechanism TM which is an automatic speed change mechanism capable of changing the speed ratio.

The control device 3 includes a rotary electric machine control unit 32 that controls the rotary electric machine MG, a power transfer control unit 33 that controls the speed change mechanism TM and the engine separation clutch CL, and a vehicle control unit 34 that integrates these control units to control the vehicle drive device 1. The hybrid vehicle also includes an engine control device 31 that controls the engine E. The input shaft I corresponds to the "input member" according to the present invention, and the output shaft O corresponds to the "output member" according to the present invention.

Figure 2:
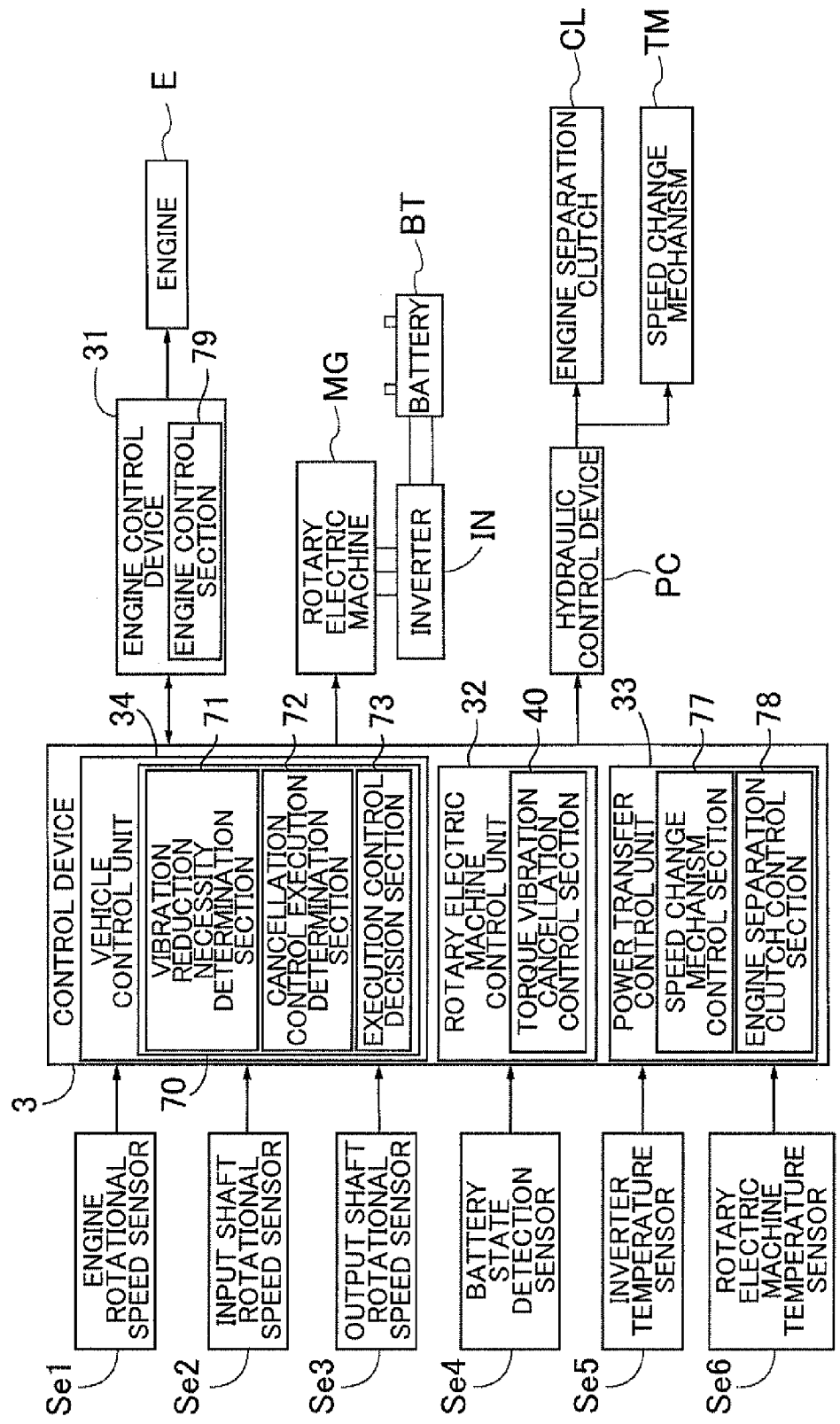
FIG. 2 is a block diagram showing the configuration of the control device according to the embodiment of the present invention.

As shown in FIG. 2, the thus configured control device 3 according to the embodiment includes a vibration reduction necessity determination section 71 that determines whether or not a required drive operation point, which is a drive operation point defined on the basis of output torque Te and a rotational speed ωe required for the engine E, falls within a reduction necessary range, which is prescribed in advance as a range in which it is necessary to reduce transfer torque vibration Teov, which is torque vibration transferred from the engine E to the rotary electric machine MG. The control device 3 also includes a cancellation control execution determination section 72 that determines whether or not torque vibration cancellation control, in which the rotary electric machine MG is caused to output torque for canceling the transfer torque vibration Teov, can be executed in the case where it is determined that the required drive operation point falls within the reduction necessary range.

The control device 3 is characterized in further including an execution control decision section 73 that decides to execute the torque vibration cancellation control in the case where it is determined that the torque vibration cancellation control can be executed and that decides to execute operation point change control, in which the drive operation point of the engine E is changed, in the case where it is determined that the torque vibration cancellation control cannot be executed. The control device 3 according to the embodiment will be described in detail below.

1. Configuration of Vehicle Drive Device

First, the configuration of the vehicle drive device 1 of the hybrid vehicle according to the embodiment will be described. As shown in FIG. 1, the hybrid vehicle is a parallel-type hybrid vehicle which includes the engine E and the rotary electric machine MG each serving as a drive force source for the vehicle, and in which the engine E and the rotary electric machine MG are drivably coupled to each other in series. The hybrid vehicle includes the speed change mechanism TM, which transfers rotation of the engine E and the rotary electric machine MG transmitted to an intermediate shaft M to the output shaft O while changing the rotational speed and converting torque.

The engine E is an internal combustion engine driven by combustion of fuel. Various engines known in the art such as a gasoline engine and a diesel engine, for example, may be used as the engine E. In the example, an engine output shaft Eo such as a crankshaft of the engine E is selectively drivably coupled via the engine separation clutch CL to the input shaft I drivably coupled to the rotary electric machine MG. That is, the engine E is selectively drivably coupled to the rotary electric machine MG via the engine separation clutch CL which is a friction engagement element. The engine output shaft Eo is drivably coupled to an engagement member of the engine separation clutch CL via a damper (not shown).

The rotary electric machine MG includes a stator fixed to a non-rotary member and a rotor supported radially inwardly of the stator so as to be rotatable. The rotor of the rotary electric machine MG is drivably coupled to the intermediate shaft M to rotate together with the intermediate shaft M. That is, in the embodiment, both the engine E and the rotary electric machine MG are drivably coupled to the intermediate shaft M. The rotary electric machine MG is electrically connected to a battery BT serving as an electricity accumulation device via an inverter IN that performs a DC/AC conversion. The rotary electric machine MG can function as a motor (electric motor) that is supplied with electric power to produce power and as a generator (electric generator) that is supplied with power to produce electric power. That is, the rotary electric machine MG performs power running using electric power supplied from the battery BT via the inverter IN, or generates electric power using a rotational drive force transferred from the engine E or the wheels W to accumulate the generated electric power in the battery BT via the inverter IN. The battery BT is an example of the electricity accumulation device. Other types of electricity accumulation devices such as a capacitor may be used, or a plurality of types of electricity accumulation devices may be used in combination. In the following description, electric power generation performed by the rotary electric machine MG is referred to as "regeneration", and negative torque output from the rotary electric machine MG during electric power generation is referred to as "regenerative torque". In the case where target output torque of the rotary electric machine is negative torque, the rotary electric machine MG outputs regenerative torque while generating electric power using a rotational drive force transferred from the engine E or the wheels W.

The speed change mechanism TM is drivably coupled to the intermediate shaft M, to which the drive force sources are drivably coupled. In the embodiment, the speed change mechanism TM is a stepped automatic transmission that provides a plurality of shift speeds with different speed ratios. In order to establish the plurality of shift speeds, the speed change mechanism TM includes a gear mechanism such as a planetary gear mechanism and a plurality of friction engagement elements B1, C1, .... The speed change mechanism TM transfers rotation of the intermediate shaft M to the output shaft O while changing the rotational speed with the speed ratio of each shift speed and converting torque. The torque transferred from the speed change mechanism TM to the output shaft O is distributed and transferred to two, left and right, axles AX via an output differential gear device DF to be transferred to the wheels W drivably coupled to the axles AX. Here, the term "speed ratio" refers to the ratio of the rotational speed of the intermediate shaft M to the rotational speed of the output shaft O in the case where each shift speed is established in the speed change mechanism TM. The term "speed ratio" as used herein refers to a value obtained by dividing the rotational speed of the intermediate shaft M by the rotational speed of the output shaft O. That is, the rotational speed of the output shaft O is obtained by dividing the rotational speed of the intermediate shaft M by the speed ratio. In addition, the torque transferred from the speed change mechanism TM to the output shaft O is obtained by multiplying torque transferred from the intermediate shaft M to the speed change mechanism TM by the speed ratio.

In the example, the engine separation clutch CL and the plurality of friction engagement elements B1, C1, ... are each an engagement element such as a clutch and a brake formed to include friction members. The friction engagement elements CL, B1, C1, ... can be continuously controlled such that the transfer torque capacity of the friction engagement element is increased and decreased by controlling the engagement pressure of the friction engagement element by controlling the supplied hydraulic pressure. A wet multi-plate clutch and a wet multi-plate brake, for example, may be suitably used as the friction engagement elements.

A friction engagement element transfers torque between engagement members of the friction engagement element through friction between the engagement members. In the case where there is a difference in rotational speed (slipping) between the engagement members of the friction engagement element, torque (slip torque) corresponding to the magnitude of the transfer torque capacity is transferred from a member with a higher rotational speed to a member with a lower rotational speed through dynamic friction. In the case where there is no difference in rotational speed (slipping) between the engagement members of the friction engagement element, torque up to the magnitude of the transfer torque capacity is transferred between the engagement members of the friction engagement element through static friction. Here, the term "transfer torque capacity" refers to the magnitude of maximum torque that can be transferred by a friction engagement element through friction. The magnitude of the transfer torque capacity varies in proportion to the engagement pressure of the friction engagement element. The term "engagement pressure" refers to a pressure that presses an input-side engagement member (friction plate) and an output-side engagement member (friction plate) against each other. In the embodiment, the engagement pressure varies in proportion to the magnitude of the supplied hydraulic pressure. That is, in the embodiment, the magnitude of the transfer torque capacity varies in proportion to the magnitude of the hydraulic pressure supplied to the friction engagement element.

Each of the friction engagement elements includes a return spring, and is urged to be disengaged by the reaction force of the spring. When a force produced by the hydraulic pressure supplied to the friction engagement element exceeds the reaction force of the spring, the friction engagement element starts producing the transfer torque capacity to bring the friction engagement element from the disengaged state into the engaged state. The hydraulic pressure at which the transfer torque capacity starts being produced is referred to as a "stroke end pressure". Each of the friction engagement elements is configured such that the transfer torque capacity of the friction engagement element increases in proportion to an increase in supplied hydraulic pressure after the hydraulic pressure exceeds the stroke end pressure.

In the embodiment, the term "engaged state" refers to a state in which a friction engagement element is producing a transfer torque capacity. The term "disengaged state" refers to a state in which a friction engagement element is not producing a transfer torque capacity. The term "slipping engagement state" refers to an engagement state in which there is a difference in rotational speed (slipping) between engagement members of a friction engagement element. The term "direct engagement state" refers to an engagement state in which there is no difference in rotational speed (slipping) between engagement members of a friction engagement element. The term "non-direct engagement state" refers to an engagement state other than the direct engagement state, and includes the disengaged state and the slipping engagement state.

2. Configuration of Hydraulic Control System

Next, a hydraulic control system of the vehicle drive device 1 will be described. The hydraulic control system includes a hydraulic control device PC that adjusts the hydraulic pressure of working oil supplied from a hydraulic pump to a predetermined pressure. Although not described in detail here, the hydraulic control device PC adjusts the degree of opening of one or two or more adjustment valves on the basis of a signal pressure from a linear solenoid valve for hydraulic pressure adjustment to adjust the amount of working oil drained from the adjustment valves, thereby adjusting the hydraulic pressure of the working oil to one or two or more predetermined pressures. After being adjusted to the predetermined pressure, the working oil is supplied to each of the friction engagement elements such as those of the speed change mechanism TM and the engine separation clutch CL at a hydraulic pressure required by the friction engagement element.

3. Configuration of Control Device

Next, the configuration of the control device 3 which controls the vehicle drive device 1 and the engine control device 31 will be described with reference to FIG. 2.

The control units 32 to 34 of the control device 3 and the engine control device 31 each include an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth. Functional sections 70 to 73 of the control device 3 and so forth are formed by software (a program) stored in the ROM of the control device or the like, hardware such as a separately provided arithmetic circuit, or a combination of both. The control units 32 to 34 of the control device 3 and the engine control device 31 are configured to communicate with each other, and perform cooperative control while sharing various information such as information detected by sensors and control parameters, thereby implementing functions of the functional sections 70 to 73.

The vehicle drive device 1 includes sensors Se1 to Se6 that output an electrical signal to be input to the control device 3 and the engine control device 31. The control device 3 and the engine control device 31 calculate information detected by the sensors on the basis of the input electrical signal. The engine rotational speed sensor Se1 is a sensor that detects the rotational speed of the engine output shaft Eo (engine E). The engine control device 31 detects a rotational speed (angular speed) ωe of the engine E on the basis of a signal input from the engine speed sensor Se1. The input shaft rotational speed sensor Se2 is a sensor that detects the rotational speed of the input shaft and the intermediate shaft M. The rotor of the rotary electric machine MG is integrally drivably coupled to the input shaft I and the intermediate shaft M. Thus, the rotary electric machine control unit 32 detects a rotational speed (angular speed) ωm of the rotary electric machine MG and the rotational speed of the input shaft I and the intermediate shaft M on the basis of a signal input from the input shaft rotational speed sensor Se2. The output shaft rotational speed sensor Se3 is a sensor attached to the output shaft O in the vicinity of the speed change mechanism TM to detect the rotational speed of the output shaft O in the vicinity of the speed change mechanism TM. The power transfer control unit 33 detects a rotational speed (angular speed) ωo of the output shaft O in the vicinity of the speed change mechanism TM on the basis of a signal input from the output shaft rotational speed sensor Se3. The rotational speed of the output shaft O is proportional to the vehicle speed. Therefore, the power transfer control unit 33 calculates the vehicle speed on the basis of the signal input from the output shaft rotational speed sensor Se3.

The battery state detection sensor Se4 is a sensor that detects the state of the battery BT such as the charge amount of the battery BT and the battery temperature. The inverter temperature sensor Se5 is a sensor that detects the temperature of the inverter IN. The rotary electric machine temperature sensor Se6 is a sensor that detects the temperature of the rotary electric machine MG.

3-1. Engine Control Device

The engine control device 31 includes an engine control section 79 that controls an operation of the engine E. In the embodiment, in the case where a command for the engine required torque is provided from the vehicle control unit 34, the engine control section 79 performs torque control in which an output torque command value is set to the engine required torque according to the command provided from the vehicle control unit 34, and in which the engine E is controlled so as to output the output torque Te corresponding to the output torque command value.

The engine control section 79 is also configured to estimate the output torque Te of the engine E to transfer the estimated torque to other control devices as estimated engine output torque. The engine control device 31 may be adapted to calculate the estimated engine output torque on the basis of the output torque command value to transfer the calculated estimated engine output torque.

3-2. Vehicle Control Unit

The vehicle control unit 34 includes functional sections that control integration of various torque control performed on the engine E, the rotary electric machine MG, the speed change mechanism TM, the engine separation clutch CL, and so forth, engagement control for the friction engagement elements, and so forth over the entire vehicle.

The vehicle control unit 34 calculates vehicle required torque, which is a target drive force to be transferred from the intermediate shaft M side to the output shaft O side, and decides the drive mode of the engine E and the rotary electric machine MG, in accordance with the accelerator operation amount, the vehicle speed, the charge amount of the battery BT, and so forth. The vehicle control unit 34 is a functional section that calculates the engine required torque, which is output torque required for the engine E, rotary electric machine required torque, which is output torque required for the rotary electric machine MG, and a target transfer torque capacity of the engine separation clutch CL to provide the calculated values to the other control units 32 and 33 and the engine control device 31 for integration control.

3-2-1. Torque Vibration Measures Integration Control

In the embodiment, the vehicle control unit 34 includes a torque vibration measures integration control section 70, which is a functional section that integrates torque vibration measures control performed on the transfer torque vibration Teov transferred from the engine B to the rotary electric machine MG. The torque vibration measures integration control section 70 includes the vibration reduction necessity determination section 71, the cancellation control execution determination section 72, and the execution control decision section 73.

The vibration reduction necessity determination section 71 is a functional section that determines whether or not the required drive operation point, which is a drive operation point defined on the basis of the output torque and the rotational speed required for the engine E, falls within the reduction necessary range, which is prescribed in advance as a range in which it is necessary to reduce the transfer torque vibration Teov which is torque vibration transferred from the engine E to the rotary electric machine MG.

The cancellation control execution determination section 72 is a functional section that determines whether or not the torque vibration cancellation control, in which the rotary electric machine MG is caused to output torque for canceling the transfer torque vibration Teov, can be executed in the case where it is determined that the required drive operation point falls within the reduction necessary range.

The execution control decision section 73 is a functional section that decides to execute the torque vibration cancellation control in the case where it is determined that the torque vibration cancellation control can be executed and that decides to execute operation point change control, in which the drive operation point of the engine E is changed, in the case where it is determined that the torque vibration cancellation control cannot be executed.

The functional sections 70 to 73 will be described in detail below with reference to the flowchart of FIG. 3 and so forth.

3-2-1-1. Transfer Torque Vibration

Figure 5:
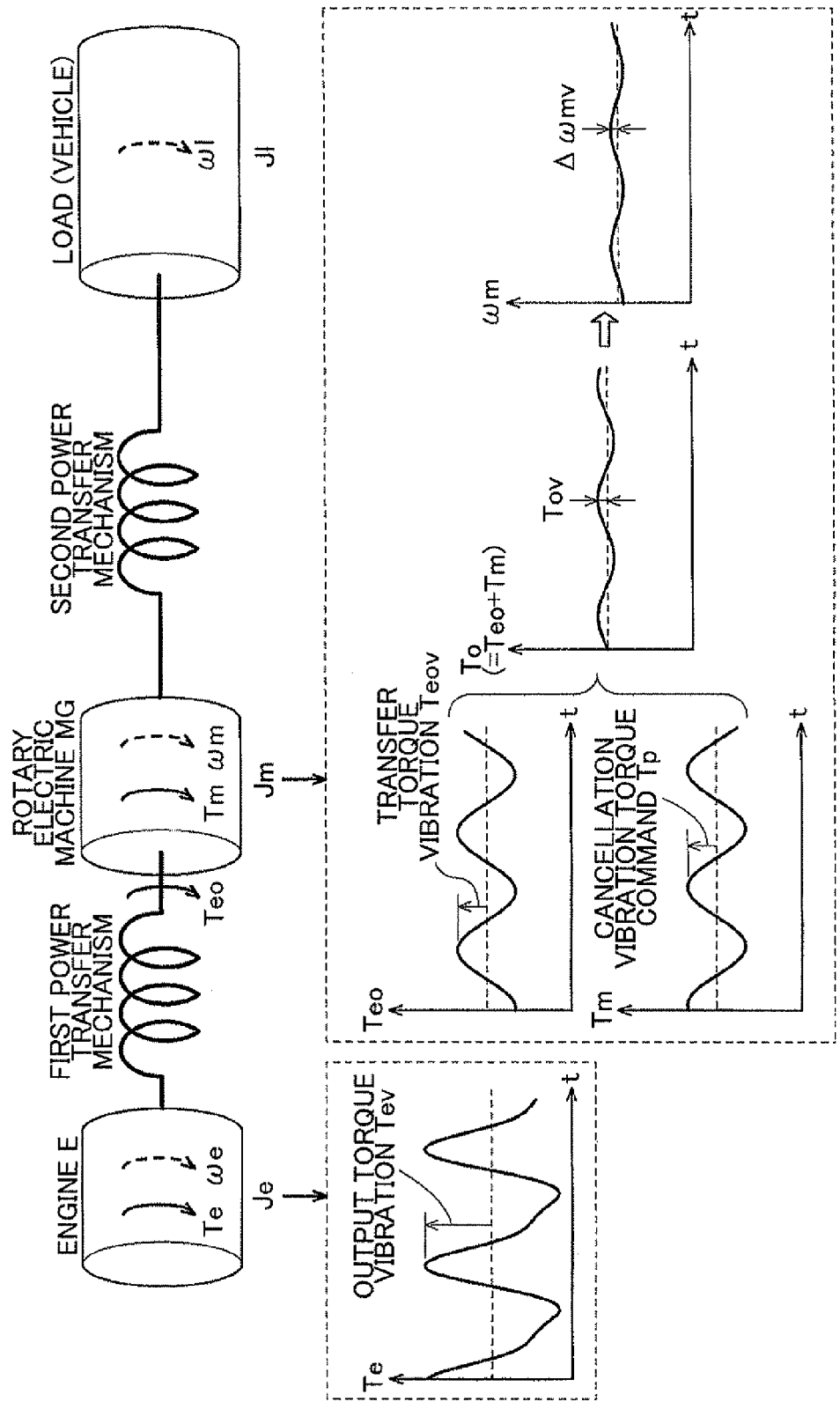
FIG. 5 shows a model of a power transfer system according to the embodiment of the present invention.

First, the transfer torque vibration Teov transferred from the engine E to the rotary electric machine MG will be described. FIG. 5 shows a model of a power transfer system of the vehicle drive device 1. The power transfer system is modeled into a three-inertia shaft torsional vibration system.

The engine E, the rotary electric machine MG, and the load (vehicle) are defined as rigid bodies having moments of inertia Je, Jm, and Jl, respectively.

The engine E and the rotary electric machine MG are coupled to each other through a first power transfer mechanism having elasticity. The rotary electric machine MG and the load (vehicle) are coupled to each other through a second power transfer mechanism having elasticity. In the embodiment, the first power transfer mechanism is formed by members such as a damper, the engine output shaft Eo, and the input member I. The first power transfer mechanism has a predetermined torsional spring constant and a viscous friction coefficient, and produces shaft torsion. The second power transfer mechanism is formed by members such as the intermediate shaft M, the speed change mechanism TM, the output shaft O, and the axles AX. The output shaft O and the axle AX produce particularly large shaft torsion, and are collectively referred to as an "output shaft". The second power transfer mechanism has a predetermined torsional spring constant and a viscous friction coefficient, and produces shaft torsion.

Here, Te indicates the output torque output from the engine E. The output torque has output torque vibration Tev which is a vibration component with respect to an average value of the output torque. ωe indicates the rotational speed (angular speed) of the engine E.

Teo indicates transfer torque which is the vibrating output torque Te of the engine E transferred to the rotary electric machine MG via the first power transfer mechanism. The transfer torque has the transfer torque vibration Teov which is a vibration component with respect to an average value of the transfer torque. Tm indicates output torque output from the rotary electric machine MG. In the case where the torque vibration cancellation control to be discussed later is executed, the output torque has torque vibration corresponding to a cancellation vibration torque command Tp for canceling the transfer torque vibration Teov. Here, the cancellation vibration torque command Tp is a vibration component with respect to an average value of the output torque Tm of the rotary electric machine MG.

Total torque To, which is obtained by totaling the transfer torque Teo and the output torque Tm of the rotary electric machine MG, has total torque vibration Tov, which is torque vibration obtained by totaling the transfer torque vibration Teov and the cancellation vibration torque command Tp. Here, the total torque vibration Tov is a vibration component with respect to an average value of the total torque To. Then, torque obtained by totaling the total torque To and torque transferred from the second power transfer mechanism to the rotary electric machine MG is divided by the moment of inertia Jm of the rotary electric machine MG and then the resulting quotient is integrated to derive the rotational speed (angular speed) of the rotary electric machine MG. The rotational speed ωm of the rotary electric machine MG includes rotational speed vibration ωmv corresponding to a value obtained by dividing the total torque vibration Tov by the moment of inertia Jm and then integrating the resulting quotient. Here, the rotational speed vibration ωmv is a vibration component with respect to an average value of the rotational speed ωm of the rotary electric machine MG. ωl indicates the rotational speed (angular speed) of an end portion of the output shaft on the load side, that is, the rotational speed (angular speed) of the load (wheels).

Next, the transfer torque vibration Teov transferred from the engine E to the rotary electric machine MG via the first power transfer mechanism will be described in more detail.

Figure 6:
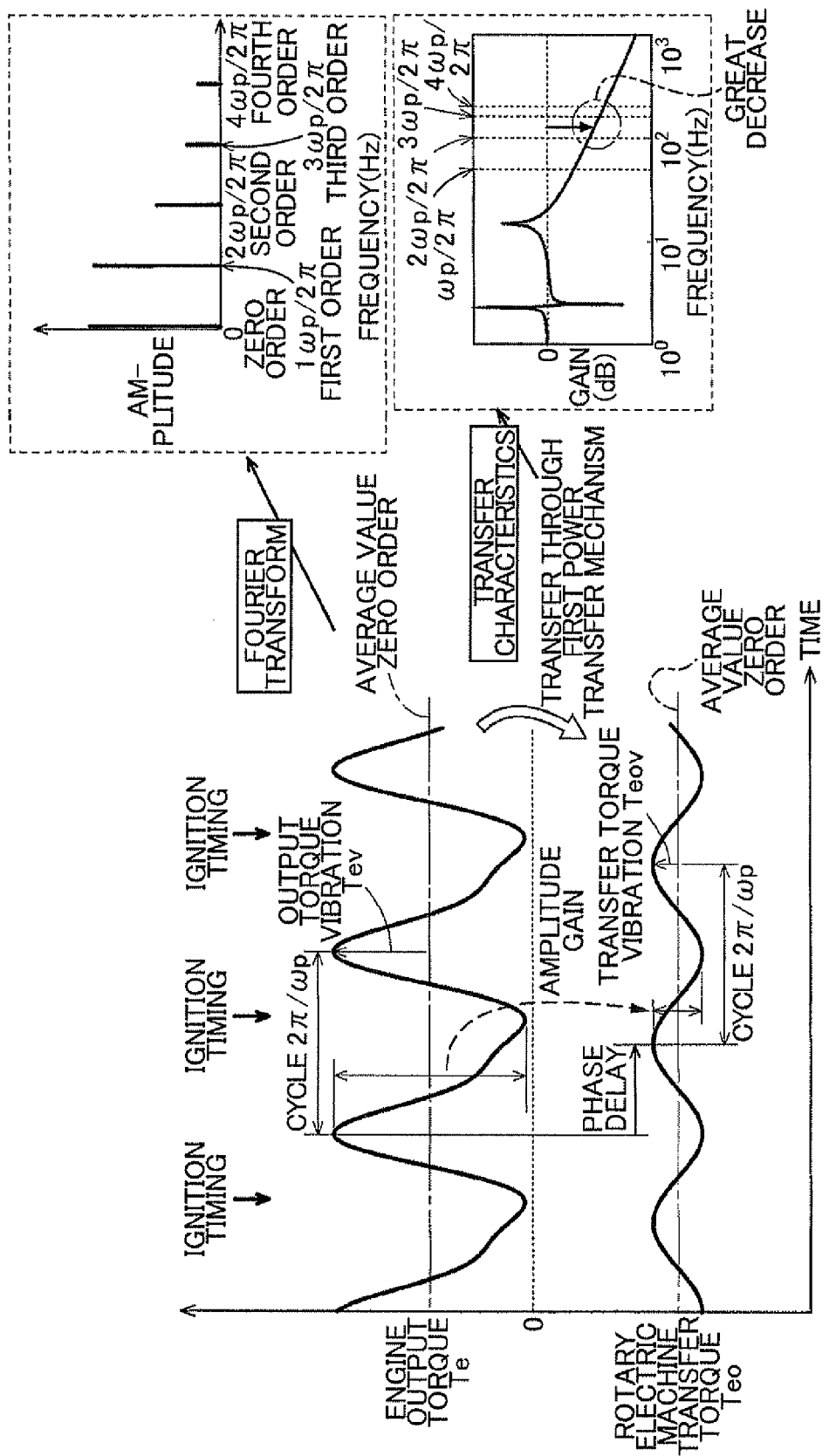
FIG. 6 illustrates transfer torque vibration transferred to a rotary electric machine according to the embodiment of the present invention.

As shown in FIG. 6, the output torque Te of the engine E is generated through combustion in a combustion stroke of the engine E. In case of a spark-ignition engine, the combustion starts after ignition timing. That is, the pressure in a combustion chamber raised through the combustion is transferred to the crankshaft (engine output shaft Eo) via a piston and a connecting rod in accordance with the geometric relationship such as a crank angle to be converted into the output torque Te of the engine E. The output torque Te of the engine E increases after the ignition timing, and decreases as the piston approaches the bottom dead center. Therefore, as shown in FIG. 6, the output torque Te of the engine E vibrates cyclically in sync with rotation. A vibration frequency (angular frequency) ωp of the output torque Te of the engine E varies in accordance with the rotational speed ωe of the engine E. For a 4-cycle engine with N cylinders, ωp=(N/2)×ωe. For a 4-cylinder engine (N=4), ωp=2×ωe. For a compression self-ignition engine such as a diesel engine, the ignition timing, that is, combustion start timing may be defined as timing to inject fuel into the combustion chamber.

As shown in FIG. 6, a Fourier transform performed on the output torque Te of the engine E derives amplitudes of frequency components of the vibration frequency ωp for zero order (frequency=0), first order (frequency (Hz)=ωp/2π), second order (frequency (Hz)=2ωp/2π), third order (frequency (Hz)=3ωp/2π), fourth order (frequency (Hz)=4ωp/2π), . . . . The amplitude of the zero-order frequency component derived from the Fourier transform corresponds to the average value of the output torque Te of the engine E. The amplitude of the first-order frequency component derived from the Fourier transform roughly corresponds to the amplitude of the output torque vibration Tev. The amplitudes of the second- and higher-order frequency components derived from the Fourier transform are smaller than the amplitude of the first-order frequency component, and decrease as the number of order becomes larger.

The output torque Te of the engine E varies to around zero. Therefore, the amplitude of the output torque vibration Tev is large. The amplitude of the output torque vibration Tev increases generally in proportion to an increase in average value of the output torque Te of the engine E. In the following description, unless otherwise noted, the output torque Te of the engine E indicates the average value of the vibrating torque.

The vibrating output torque Te of the engine E is transferred to the rotary electric machine MG via the first power transfer mechanism to serve as the transfer torque Teo. In the torque transfer characteristics of the first power transfer mechanism, as shown in the Bode diagrams of the torque transfer characteristics shown in FIGS. 6 and 14B, the gain decreases to be less than 0 dB as the vibration frequency ωp increases in a band of the vibration frequency ωp corresponding to a drive range of the engine E at the rotational speed ωe. For example, in the band of the vibration frequency ωp, the gain decreases at about −40 dB/dec. Therefore, as shown in the Bode diagram of FIG. 6, the gain of the first-order frequency component is decreased to be less than 0 dB, and the gains of the second- and higher-order frequency components are decreased to a greater degree than the gain of the first-order frequency component. The gains of the second- and higher-order frequency components are decreased exponentially in units of dB, and thus decreased greatly. The gain of the zero-order frequency component is 0 dB, and therefore the average value of the output torque Te of the engine E is not decreased, and serves as it is as the average value of the output torque vibration Tev.

Therefore, the output torque vibration Tev is transferred to the rotary electric machine MG with the amplitudes of the second- and higher-order vibration components significantly decreased by the transfer characteristics of the first power transfer mechanism compared to the decrease in amplitude of the first-order vibration component. Therefore, as shown in FIG. 6, the amplitudes of the second- and higher-order vibration components of the transfer torque vibration Teov in the transfer torque Teo are significantly decreased to be close to the amplitude of the first-order vibration component. The amplitude of the first-order vibration component is also decreased. Thus, the transfer torque vibration Teov may be approximated using the first-order vibration component with respect to the vibration frequency ωp as indicated by the following formula:

$$Teov(t)=\Delta Teov \cos(\omega p\, t+\beta) \quad (1)$$

Here, ΔTeov is the amplitude of the transfer torque vibration Teov, and β is the phase of the transfer torque vibration Teov.

As shown in FIG. 6, in addition, the output torque vibration Tev is transferred to the rotary electric machine MG with a phase delay caused by the transfer characteristics of the first power transfer mechanism. As indicated by the phase curve in the Bode diagram of FIG. 14B, a phase delay of about −180 deg to −160 deg may be caused.

It is found that the transfer torque vibration Teov, which may be approximated using the first-order vibration component with respect to the vibration frequency ωp as described above, may be canceled by causing the rotary electric machine MG to output torque vibration opposite in phase to the transfer torque vibration Teov indicated by the formula (1), that is, torque vibration advanced or delayed in phase with respect to the transfer torque vibration Teov by π (180 deg). Therefore, as discussed later, the amplitude of the cancellation vibration torque command Tp is set to be equal to the amplitude ΔTeov of the transfer torque vibration, and the frequency of the cancellation vibration torque command Tp is set to be equal to the vibration frequency ωp.

3-2-1-2. Reduction Necessary Range

Next, the reduction necessary range which is prescribed in advance as a range in which it is necessary to reduce the transfer torque vibration Teov will be described.

Figure 14A:
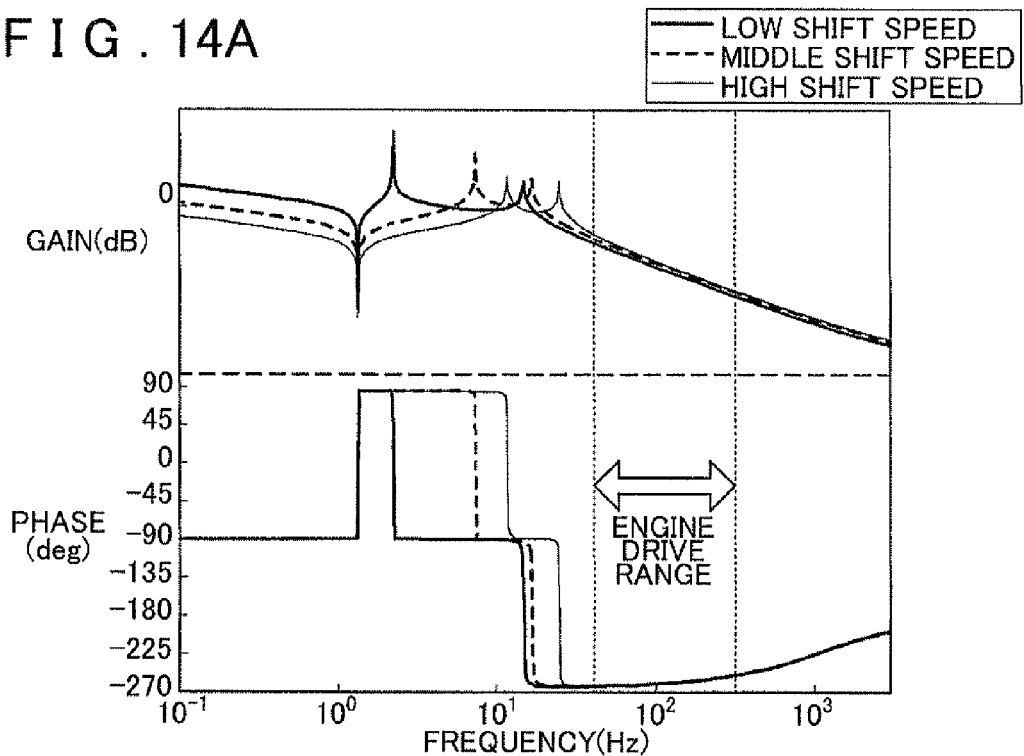
Figure 14B:
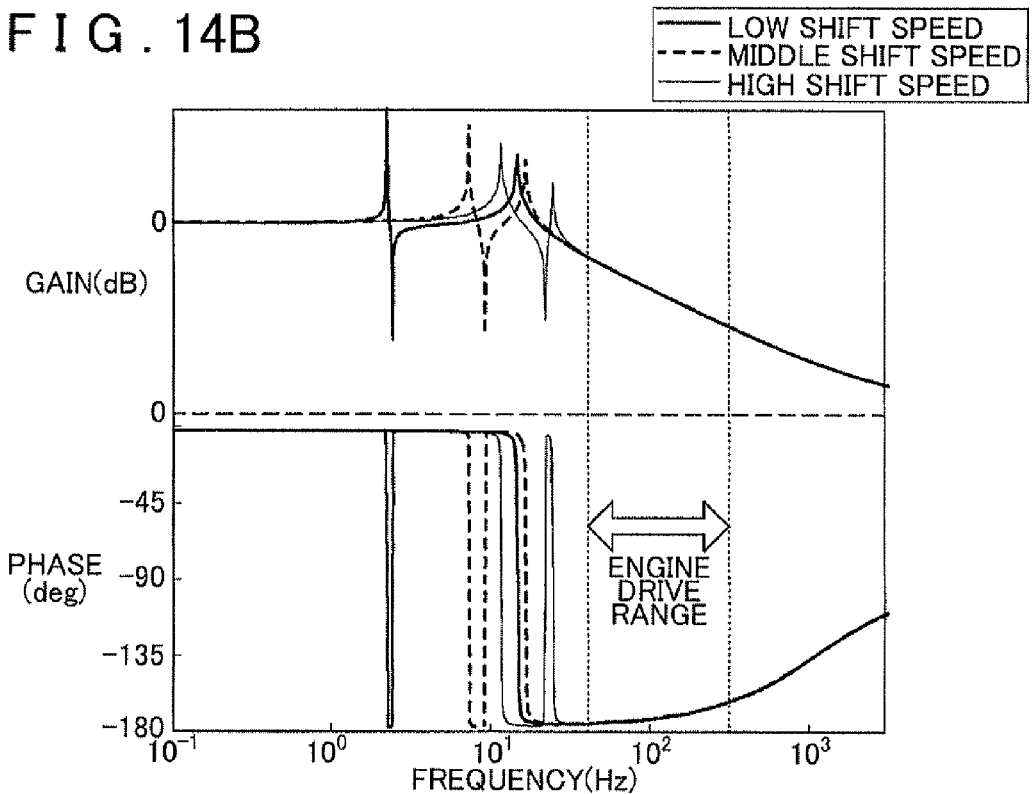

From the torque transfer characteristics of the first power transfer mechanism shown in FIG. 14B, it is found that the gain reduces in proportion to the rotational speed ωe of the engine E in the drive range of the engine E. Therefore, at a low rotational speed ωe (for example, 1000 rpm), the gain decreases slightly, and the amplitude ΔTeov of the transfer torque vibration is large. As the average value of the output torque Te of the engine E is larger, the amplitude of the output torque vibration Tev in the output torque Te is larger, and the amplitude ΔTeov of the transfer torque vibration for the same gain (rotational speed) is larger.

Figure 4:
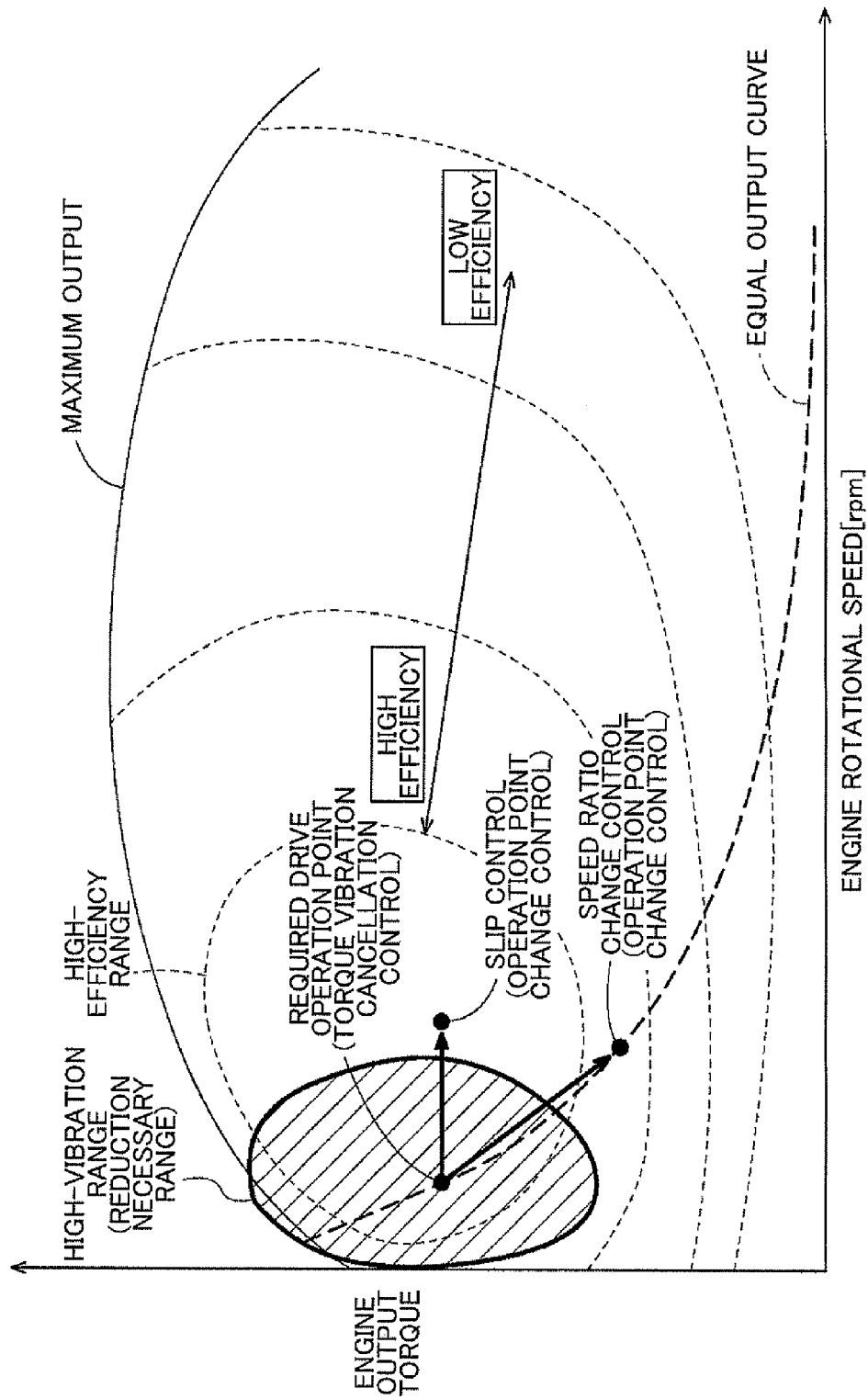
FIG. 4 shows the concept of a reduction necessary range according to the embodiment of the present invention.

Therefore, as shown in FIG. 4, a range at a low rotational speed ωe and with high output torque Te is defined as a high-vibration range, in which the amplitude ΔTeov of the transfer torque vibration is large enough to cause a discomfort to a driver. As shown in FIG. 4, in addition, the high-vibration range overlaps a high-efficiency range, in which the thermal efficiency of the engine E is high. Therefore, positively driving the engine E in the high-vibration range is effective in improving the fuel efficiency.

In the embodiment, the torque vibration measures integration control section 70 prescribes in advance the high-vibration range as the reduction necessary range, in which it is necessary to reduce the transfer torque vibration, using both the rotational speed ωe and the output torque Te of the engine E.

The torque vibration measures integration control section 70 performs torque vibration measures control in the case where the required drive operation point required for the engine E falls within the reduction necessary range. That is, in the case where it is determined that the torque vibration cancellation control can be executed, the torque vibration measures integration control section 70 decides to execute the torque vibration cancellation control, so that the engine E can be driven in the reduction necessary range with the output torque of the rotary electric machine MG canceling the transfer torque vibration Teov. In the case where it is determined that the torque vibration cancellation control cannot be executed, on the other hand, the torque vibration measures integration control section 70 decides to execute the operation point change control, in which the drive operation point of the engine E is changed.

3-2-2. Vibration Reduction Necessity Determination Section

Figure 3:
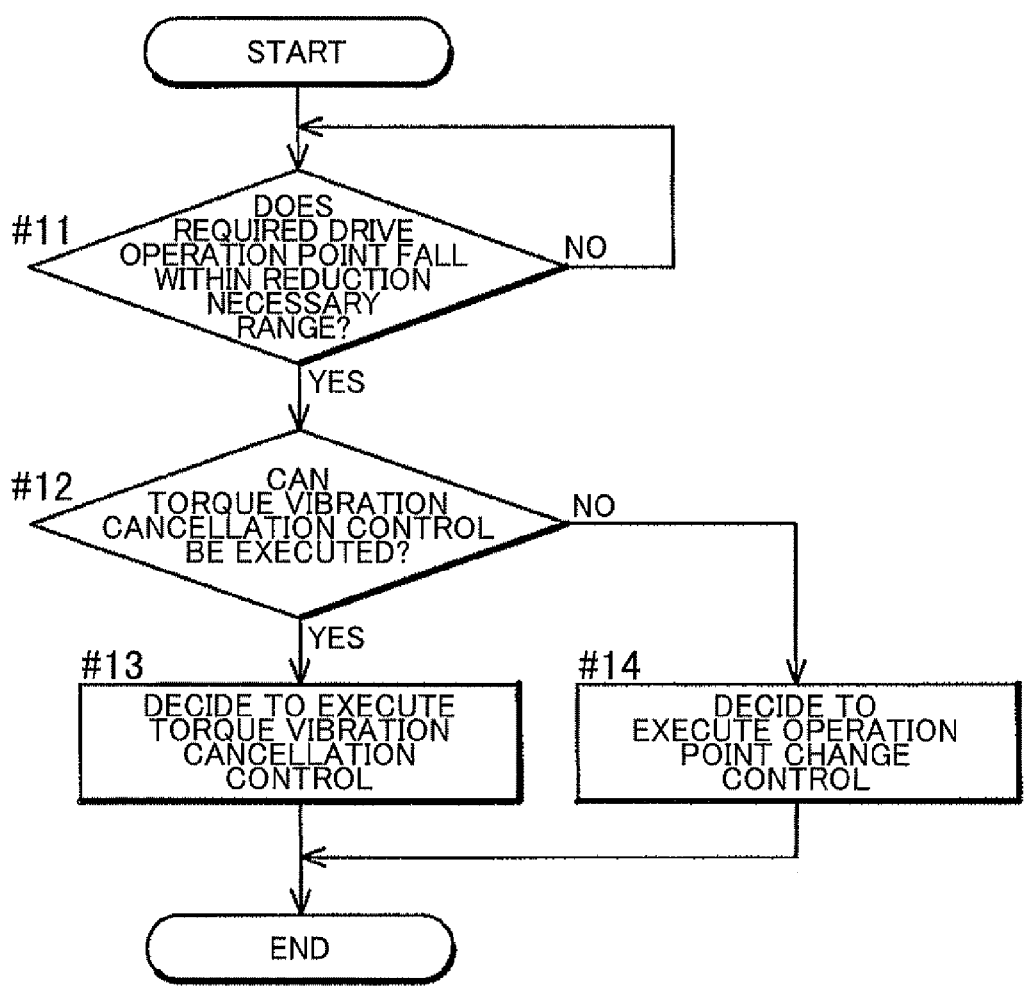
FIG. 3 is a flowchart showing the process procedure of torque vibration measures control executed by the control device according to the embodiment of the present invention.

As described above, the vibration reduction necessity determination section 71 determines whether or not the required drive operation point, which is a drive operation point defined on the basis of the output torque and the rotational speed required for the engine E, falls within the reduction necessary range, which is prescribed in advance as a range in which it is necessary to reduce the transfer torque vibration Teov which is torque vibration transferred from the engine E to the rotary electric machine MG (step #11 of FIG. 3).

In the embodiment, the vibration reduction necessity determination section 71 defines the required drive operation point on the basis of the rotational speed ωe of the engine E and the engine required torque. The vibration reduction necessity determination section 71 also stores information on the reduction necessary range prescribed in advance using both the rotational speed ωe and the output torque Te of the engine E as shown in FIG. 4. The vibration reduction necessity determination section 71 determines whether or not the required drive operation point falls within the reduction necessary range.

3-2-3. Cancellation Control Execution Determination Section

As described above, the cancellation control execution determination section 72 determines whether or not the torque vibration cancellation control, in which the rotary electric machine MG is caused to output torque for canceling the transfer torque vibration Teov, can be executed (step #12 of FIG. 3) in the case where it is determined that the required drive operation point falls within the reduction necessary range (step #11 of FIG. 3: Yes).

Specifically, in the embodiment, the cancellation control execution determination section 72 determines whether or not the torque vibration cancellation control can be executed on the basis of the state of at least one of the rotary electric machine MG, the battery BT, and the inverter IN.

The cancellation control execution determination section 72 determines, on the basis of the state of the battery BT such as the charge amount of the battery BT and the battery temperature, whether or not the battery BT can supply electric power necessary for the rotary electric machine MG to execute the torque vibration cancellation control. The cancellation control execution determination section 72 determines that the torque vibration cancellation control can be executed in the case where it is determined that the necessary electric power can be supplied, and determines that the torque vibration cancellation control cannot be executed in the case where it is determined that the necessary electric power cannot be supplied. The state of the battery BT is detected by the battery state detection sensor Se4 provided to the battery BT.

The cancellation control execution determination section 72 determines that sufficient electric power cannot be supplied in the case where the charge amount of the battery BT is a predetermined determination charge value or less.

As described above, the amplitude ΔTeov and the vibration frequency ωp of the transfer torque vibration Teov differ in accordance with the drive operation point of the rotational speed ωe and the output torque Te of the engine E. Therefore, the amplitude and the frequency of the cancellation vibration torque command Tp for canceling the transfer torque vibration Teov also differ in accordance with the drive operation point, and electric power for executing the torque vibration cancellation control also differs. Therefore, in the embodiment, the cancellation control execution determination section 72 calculates execution electric power, which is electric power for executing the torque vibration cancellation control, from an amplitude ΔTp and the frequency ωp of the cancellation vibration torque command Tp decided by an amplitude/frequency decision section 41 of a torque vibration cancellation control section 40 (see FIG. 11) to be discussed later to decide the determination charge value on the basis of the execution electric power. As the amplitude ΔTp and the frequency ωp are greater, the execution electric power is higher, and the decided determination charge value is also larger.

In the case where the temperature of the battery BT is a predetermined lower limit temperature or less, the cancellation control execution determination section 72 determines that sufficient electric power cannot be supplied, because the internal resistance of the battery BT is high. In the case where the temperature of the battery BT is a predetermined upper limit temperature or more, meanwhile, the cancellation control execution determination section 72 determines that electric power cannot be supplied, because execution of the torque vibration cancellation control may make the temperature so high as to shorten the life of the battery BT. Therefore, the cancellation control execution determination section 72 determines that electric power can be supplied in the case where the temperature of the battery BT falls between the predetermined lower limit temperature and the predetermined upper limit temperature. The lower limit temperature and the upper limit temperature may be decided on the basis of the execution electric power. In this case, the lower limit temperature is increased and the upper limit temperature is decreased as the execution electric power becomes higher.

In the case where the temperature of the rotary electric machine MG is a predetermined rotary electric machine determination temperature or more, the cancellation control execution determination section 72 determines that the torque vibration cancellation control cannot be executed, because execution of the torque vibration cancellation control may make the temperature of the rotary electric machine MG too high. In the case where the temperature of the rotary electric machine MG is less than the predetermined rotary electric machine determination temperature, meanwhile, the cancellation control execution determination section 72 determines that the torque vibration cancellation control can be executed. The temperature of the rotary electric machine MG is detected by the rotary electric machine temperature sensor Se6 provided to the rotary electric machine MG. The rotary electric machine determination temperature may be decided on the basis of the execution electric power. In this case, the rotary electric machine determination temperature is decreased as the execution electric power becomes higher.

In the case where the temperature of the inverter IN is a predetermined inverter determination temperature or more, the cancellation control execution determination section 72 determines that the torque vibration cancellation control cannot be executed, because execution of the torque vibration cancellation control may make the temperature of the inverter IN too high. In the case where the temperature of the inverter IN is less than the predetermined inverter determination temperature, meanwhile, the cancellation control execution determination section 72 determines that the torque vibration cancellation control can be executed. The temperature of the inverter IN is detected by the inverter temperature sensor Se5 provided to the inverter IN. The inverter determination temperature may be decided on the basis of the execution electric power. In this case, the inverter determination temperature is decreased as the execution electric power becomes higher.

3-2-4. Execution Control Decision Section

As described above, the execution control decision section 73 decides to execute the torque vibration cancellation control (step #13) in the case where it is determined that the torque vibration cancellation control can be executed (step #12 of FIG. 3: Yes), and decides to execute the operation point change control, in which the drive operation point of the engine E is changed, (step #14) in the case where it is determined that the torque vibration cancellation control cannot be executed (step #12: No).

That is, in the case where the required drive operation point required for the engine E falls within the reduction necessary range and it is determined that the torque vibration cancellation control can be executed, the execution control decision section 73 causes the rotary electric machine control unit 32 to execute the torque vibration cancellation control without changing the drive operation point required for the engine E. This allows the transfer torque vibration Teov of the engine E to be canceled by the output torque of the rotary electric machine MG and prevents the transfer torque vibration Teov of the engine E from being transferred to the wheels W side, while controlling the drive operation point of the engine E to the high-efficiency range. Therefore, the fuel efficiency can be improved and a discomfort caused to the driver can be suppressed at the same time.

On the other hand, in the case where the required drive operation point required for the engine E falls within the reduction necessary range and it is determined that the torque vibration cancellation control cannot be executed, the execution control decision section 73 causes the power transfer control unit 33 to execute the operation point change control, in which the drive operation point of the engine E is changed, without causing the rotary electric machine control unit 32 to execute the torque vibration cancellation control. This allows the drive operation point of the engine E to be changed and prevents the transfer torque vibration Teov of the engine E from causing a discomfort to the driver, without execution of the torque vibration cancellation control.

3-2-4-1. Operation Point Change Control

The operation point change control is at least one of speed ratio change control, in which the speed ratio of the speed change mechanism TM is changed to vary the rotational speed ωe of the engine E, and slip control, in which the engine separation clutch CL which is a friction engagement device provided on the power transfer path 2 and capable of adjusting the state of transfer of rotation is brought into the slip state (slipping engagement state).

3-2-4-1-1. Speed Ratio Change Control

In the speed ratio change control, the speed ratio of the speed change mechanism TM is changed to vary the rotational speed ωe of the engine E. That is, in the speed ratio change control, the speed ratio of the speed change mechanism TM is changed to bring the rotational speed ωe of the engine E out of the reduction necessary range. The rotational speed ωe of the engine E with respect to the vehicle speed (rotational speed of the output shaft O) is raised in proportion to an increase in speed ratio. On the other hand, the rotational speed ωe of the engine E with respect to the vehicle speed (rotational speed of the output shaft O) is reduced in proportion to a decrease in speed ratio.

In the example shown in FIG. 4, the rotational speed ωe is low in the reduction necessary range. Thus, the speed ratio of the speed change mechanism TM is increased to raise the rotational speed ωe of the engine E out of the reduction necessary range. In the embodiment, the speed change mechanism TM provides a plurality of shift speeds with different speed ratios. Therefore, a downshift is executed to change to a shift speed with a higher speed ratio. Therefore, the vehicle control unit 34 provides the power transfer control unit 33 with a command for a change target shift speed for bringing the rotational speed ωe of the engine E out of the reduction necessary range.

Torque transferred from the engine E side to the output shaft O with respect to the output torque Te of the engine E is increased in proportion to an increase in speed ratio. Therefore, in the embodiment, the engine required torque is changed in inverse proportion to the speed ratio so that changes in speed ratio will not vary torque transferred from the engine E side to the output shaft O. That is, as shown in FIG. 4, the engine required torque is varied in accordance with variations in rotational speed ωe of the engine E on the equal output curve.

3-2-4-1-2. Slip Control

In the slip control, the engine separation clutch CL, which is a friction engagement device provided on the power transfer path 2 and capable of adjusting the state of transfer of rotation, is brought into the slip state. That is, in the slip control, the engagement state of the engine separation clutch CL is controlled to the slipping engagement state to change the drive operation point of the engine E and so that the output torque vibration Tev of the engine E will not be transferred to the output shaft O.

In the slip control, the rotational speed of an engagement member of the engine separation clutch CL on the engine E side is increased to be higher than the rotational speed of an engagement member on the output shaft O side to establish the slipping engagement state, in which there is a difference in rotational speed (slipping) between the engagement members, and the target transfer torque capacity of the engine separation clutch CL is set to the engine required torque. This allows torque (slip torque) corresponding to the magnitude of the transfer torque capacity to be transferred from the engagement member on the engine E side to the engagement member on the output shaft O side in the engine separation clutch CL through dynamic friction. In the slipping engagement state, torque corresponding to the magnitude of the transfer torque capacity is transferred between the engagement members of the engine separation clutch CL. Thus, the output torque vibration Tev transferred to the engagement member on the engine E side is not transferred to the engagement member on the output shaft O side. In addition, the rotational speed toe of the engine E is increased through the slip control. Thus, the drive operation point of the engine E is changed in the direction of being brought out of the reduction necessary range. In the case where the engine separation clutch CL is controlled to the direct engagement state before or after the start of the slip control, the target transfer torque capacity of the engine separation clutch CL is set to a complete engagement capacity allowing the direct engagement state to be maintained even if the output torques of the engine E and the rotary electric machine MG are varied to their maximum values.

In the embodiment, the friction engagement device to be brought into the slipping engagement state is the engine separation clutch CL. However, such a friction engagement device may be a friction engagement element for establishment of a shift speed, among the plurality of friction engagement elements B1, C1, . . . of the speed change mechanism TM. Also in this case, the output torque vibration Tev is not transferred to the output shaft O side with respect to the friction engagement element of the speed change mechanism TM brought into the slipping engagement state.

3-2-4-1-3. Selection of speed Ratio Change Control or Slip Control

In the embodiment, the execution control decision section 73 is configured to select, as the operation point change control, one of the speed ratio change control and the slip control that causes a smaller reduction in energy efficiency of the vehicle drive device 1 on the basis of the drive operation point of the engine E and the rotational speed of the output shaft O, and to decide to execute the selected control.

The reduction in energy efficiency in the speed ratio change control is set on the basis of the amount of reduction in thermal efficiency of the engine E resulting from a change in drive operation point of the engine E due to a change in speed ratio. In the embodiment, the execution control decision section 73 includes a three-dimensional map, such as that shown in FIG. 4, in which the thermal efficiency of the engine E is set in accordance with the rotational speed ωe and the output torque Te of the engine E. The reduction in energy efficiency in the speed ratio change control is calculated, on the basis of the thermal efficiency setting map, as the amount of reduction in thermal efficiency between the thermal efficiency of the engine E based on the rotational speed we of the engine E and the required output torque before the speed ratio is changed and the thermal efficiency of the engine E based on the rotational speed ωe of the engine E and the engine required torque after the speed ratio is changed. Here, the rotational speed ωe of the engine E after the speed ratio is changed is a value obtained by dividing the speed ratio after the change by the speed ratio before the change and multiplying the resulting quotient by the rotational speed ωe of the engine E before the speed ratio is changed. Meanwhile, the engine required torque after the speed ratio is changed is a value obtained by dividing the speed ratio before the change by the speed ratio after the change and multiplying the resulting quotient by the required torque for the engine E before the speed ratio is changed.

The reduction in energy efficiency in the slip control is calculated on the basis of the sum of the amount of reduction in thermal efficiency of the engine E resulting from a change in drive operation point of the engine E with the engine separation clutch CL brought into the slip state and the amount of loss due to frictional heat from the engine separation clutch CL.

In the embodiment, the amount of reduction in thermal efficiency of the engine E is calculated, on the basis of the thermal efficiency setting map, as the amount of reduction in thermal efficiency between the thermal efficiency of the engine E based on the rotational speed ωe of the engine E and the required output torque before the slip state is established and the thermal efficiency of the engine E based on a rotational speed obtained by adding a predetermined slip differential rotational speed to the rotational speed ωe of the engine E before the slip state is established and the engine required torque before the slip state is established. The amount of loss due to frictional heat is set on the basis of a value obtained by multiplying the engine required torque, which is set to the target transfer torque capacity, by the slip differential rotational speed. Here, the slip differential rotational speed is the difference in rotational speed of the engine separation clutch CL in the case where the slip control is executed.

3-3. Power Transfer Control Unit

The power transfer control unit 33 includes a speed change mechanism control section 77 that controls the speed change mechanism TM and an engine separation clutch control section 78 that controls the engine separation clutch CL. The power transfer control unit 33 receives information detected by the sensors such as the output shaft rotational speed sensor Se3.

3-3-1. Control of Speed Change Mechanism

The speed change mechanism control section 77 controls establishment of a shift speed in the speed change mechanism TM. In the embodiment, in the case where no command for a change target shift speed is provided from the vehicle control unit 34, the speed change mechanism control section 77 decides a target shift speed for the speed change mechanism TM on the basis of information detected by the sensors such as the vehicle speed, the accelerator operation amount, and the shift position. In the case where a command for a change target shift speed is provided from the vehicle control unit 34, on the other hand, the speed change mechanism control section 77 decides the change target shift speed according to the command as the target shift speed for the speed change mechanism TM. Then, the speed change mechanism control section 77 controls the hydraulic pressure to be supplied to the friction engagement elements C1, B1, . . . provided in the speed change mechanism TM via the hydraulic control device PC to engage or disengage the friction engagement elements in order to establish the target shift speed in the speed change mechanism TM. Specifically, the speed change mechanism control section 77 provides the hydraulic control device PC with a command for a target hydraulic pressure (command pressure) for the friction engagement elements B1, C1, . . . , and the hydraulic control device PC supplies the friction engagement elements with the target hydraulic pressure (command pressure) according to the command.

3-3-2. Control of Engine Separation Clutch

The engine separation clutch control section 78 engages and disengages the engine separation clutch CL. In the embodiment, the engine separation clutch control section 78 controls the hydraulic pressure to be supplied to the engine separation clutch CL via the hydraulic control device PC such that the transfer torque capacity of the engine separation clutch CL matches the target transfer torque capacity according to the command provided from the vehicle control unit 34. Specifically, the engine separation clutch control section 78 provides the hydraulic control device PC with a command for a target hydraulic pressure (command pressure) set on the basis of the target transfer torque capacity, and the hydraulic control device PC supplies the engine separation clutch CL with the target hydraulic pressure (command pressure) according to the command.

3-4. Rotary Electric Machine Control Unit

Figure 11:
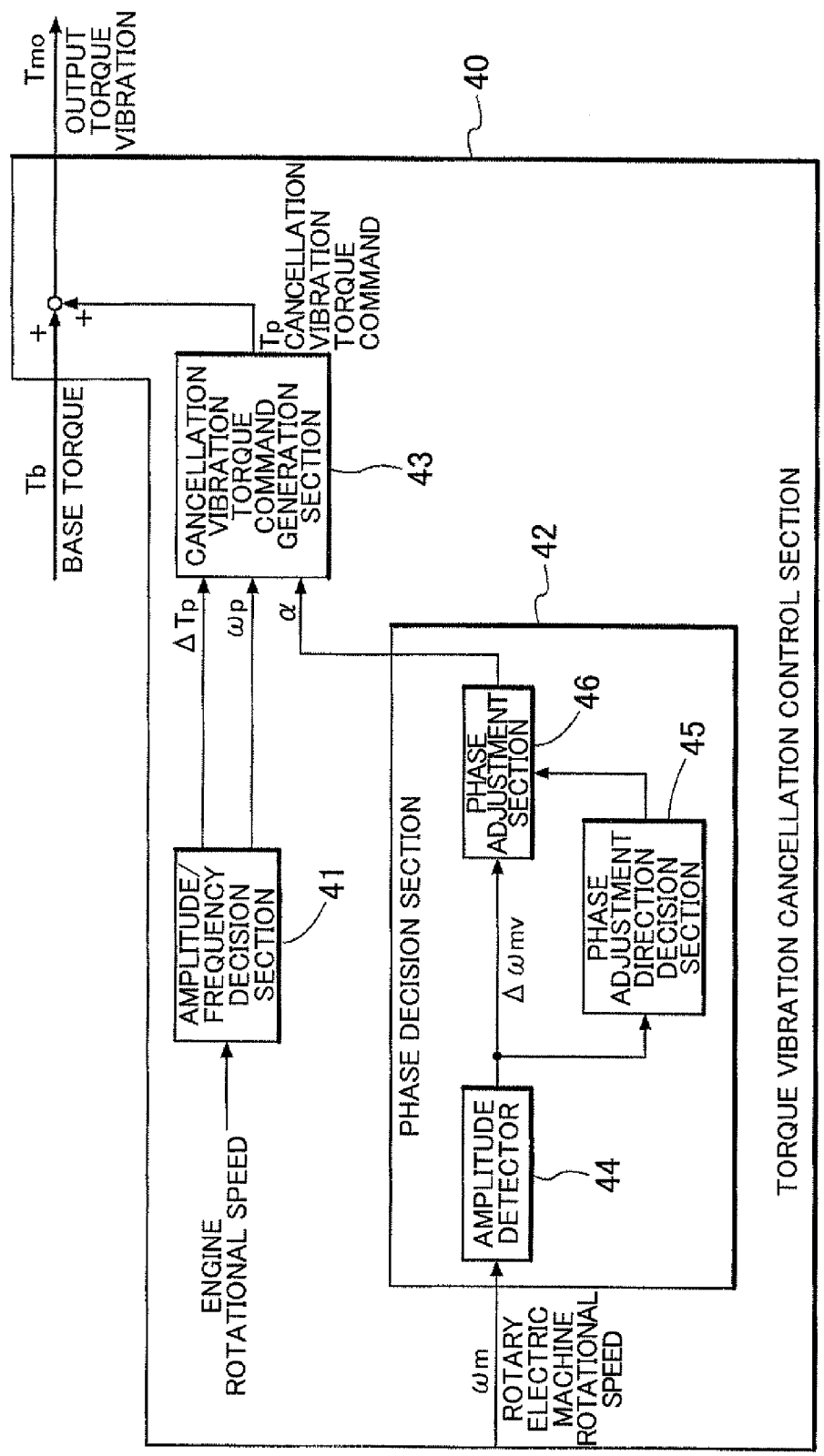
FIG. 11 is a block diagram showing the configuration of a torque vibration cancellation control section according to the embodiment of the present invention.

The rotary electric machine control unit 32 includes a functional section that controls an operation of the rotary electric machine MG. In the embodiment, the rotary electric machine control unit 32 sets a base torque command value Tb on the basis of the rotary electric machine required torque according to the command provided from the vehicle control unit 34. The rotary electric machine control unit 32 also includes the torque vibration cancellation control section 40 which calculates the cancellation vibration torque command Tp in the case where a command for execution of the torque vibration cancellation control is provided from the vehicle control unit 34 as shown in FIG. 11. The rotary electric machine control unit 32 sets an output torque command value Tmo on the basis of the base torque command value Tb and the cancellation vibration torque command Tp to be discussed later, and controls the rotary electric machine MG so as to output the output torque Tm corresponding to the output torque command value Tmo.

3-4-1. Torque Vibration Cancellation Control Section

As shown in FIG. 11, the torque vibration cancellation control section 40 is a functional section that in the case where a command for execution of the torque vibration cancellation control is provided from the vehicle control unit 34, generates the cancellation vibration torque command Tp, which is a command for torque vibration for canceling the transfer torque vibration Teov (see FIGS. 5 to 7, for example), which is torque vibration transferred from the engine E to the rotary electric machine MG, and that executes the torque vibration cancellation control, in which the rotary electric machine MG is controlled in accordance with the cancellation vibration torque command Tp.

In order to execute the torque vibration cancellation control, as shown in FIG. 11, the torque vibration cancellation control section 40 includes the amplitude/frequency decision section 41, a phase decision section 42, and a cancellation vibration torque command generation section 43.

The amplitude/frequency decision section 41 decides the amplitude ΔTp and the frequency ωp of the cancellation vibration torque command Tp on the basis of at least the rotational speed ωe of the engine E. The phase decision section 42 decides a phase α of the cancellation vibration torque command. The cancellation vibration torque command generation section 43 generates the cancellation vibration torque command Tp on the basis of the amplitude ΔTp, the frequency ωp, and the phase α.

The phase decision section 42 decides the phase adjustment direction on the basis of variations in rotational speed amplitude Δωmv, which is derived on the basis of the rotational speed ωm of the rotary electric machine MG, so as to decrease the rotational speed amplitude Δωmv, and varies the phase α of the cancellation vibration torque command in the decided phase adjustment direction.

Processes of the torque vibration cancellation control executed by the torque vibration cancellation control section 40 will be described in detail below.

3-4-2. Cancellation Vibration Torque Command

As described above, the transfer torque vibration Teov, which may be approximated using the first-order vibration component with respect to the vibration frequency ωp, may be canceled by causing the rotary electric machine MG to output torque vibration opposite in phase to the transfer torque vibration Teov indicated by the formula (1), that is, torque vibration advanced or delayed in phase with respect to the transfer torque vibration Teov by π (180 deg).

Figure 7:
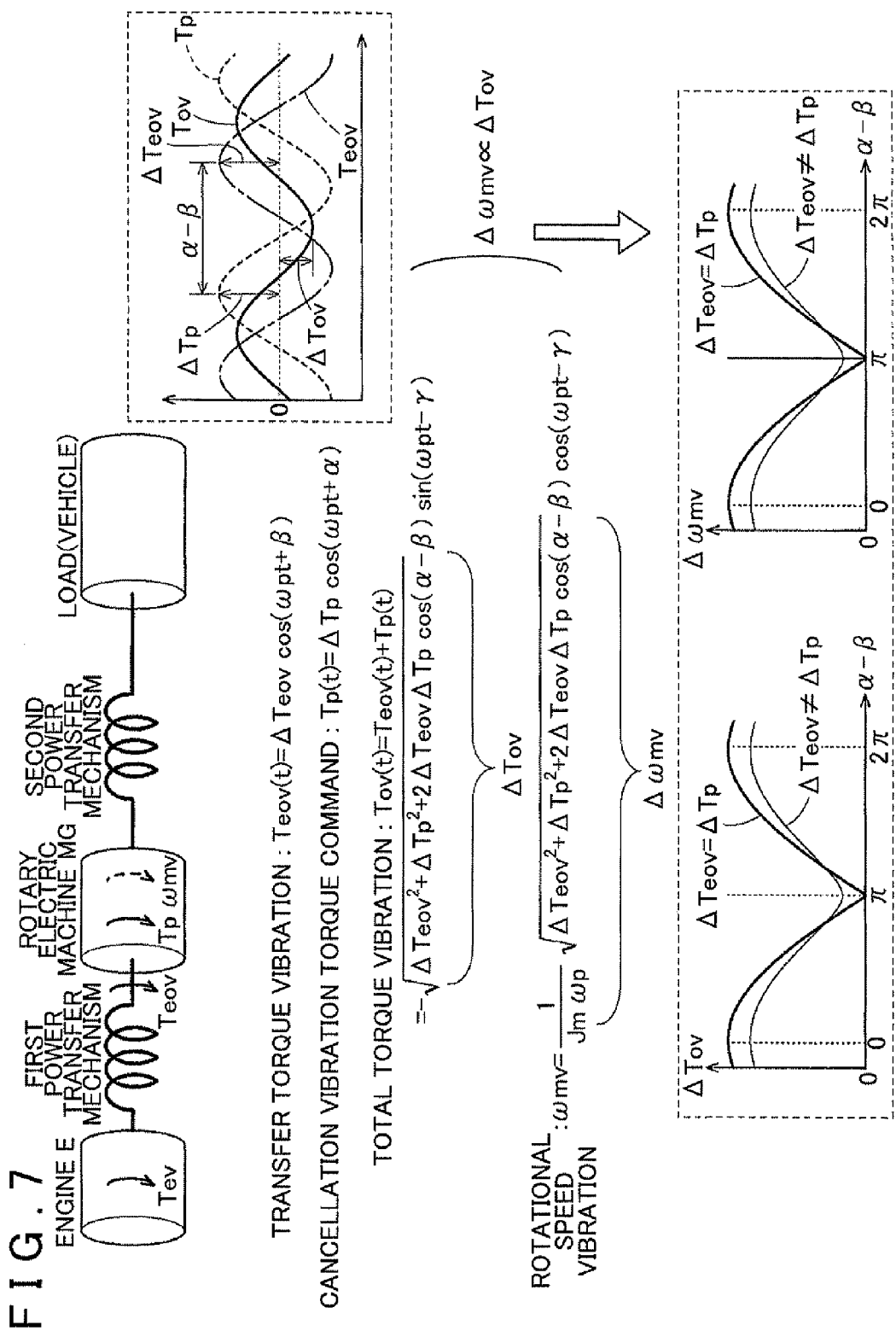
FIG. 7 illustrates total torque vibration and rotational speed vibration of the rotary electric machine according to the embodiment of the present invention.

Therefore, the torque vibration cancellation control section 40 forms the cancellation vibration torque command Tp using the first-order vibration component with respect to the vibration frequency ωp as shown in FIG. 7 and indicated by the following formula:

$$Tp(t) = \Delta Tp \cos(\omega p\, t + \alpha) \quad (2)$$

Here, ΔTp is the amplitude of the cancellation vibration torque command Tp, ωp is the vibration frequency of the cancellation vibration torque command Tp, and α is the phase of the cancellation vibration torque command Tp. It is found that the transfer torque vibration Teov may be canceled by the cancellation vibration torque command Tp by setting the vibration frequency ωp of the cancellation vibration torque command Tp to the same vibration frequency ωp as that of the transfer torque vibration Teov, setting the phase α to be opposite in phase to the phase β, that is, to be advanced or delayed with respect to the phase β by π (180 deg), and setting the amplitude ΔTp to be equal to the amplitude ΔTeov.

The total torque vibration Tov, which is the total of the transfer torque vibration Teov and the cancellation vibration torque command Tp, is obtained on the basis of the formulas (1) and (2), and can be organized as indicated by the following formula:

$$Tov(t) = Teov(t) + Tp(t) \quad (3)$$
$$= -\sqrt{\Delta Teov^2 + \Delta Tp^2 + 2\Delta Teov \Delta Tp \cos(\alpha - \beta)} \sin(\omega pt - \gamma)$$

Here, $\gamma$ is the phase of the total torque vibration Tov.

An amplitude $\Delta Tov$ of the total torque vibration Tov is derived from this formula, and indicated by the following formula:

$$\Delta Tov = \sqrt{\Delta Teov^2 + \Delta Tp^2 + 2\Delta Teov \Delta Tp \cos(\alpha - \beta)} \quad (4)$$

The rotational speed vibration only obtained by the total torque vibration Tov is obtained by dividing the total torque vibration Tov indicated by the formula (3) by the moment of inertia Jm and then integrating the quotient as indicated by the following formula:

$$\omega mv = \frac{1}{Jm\omega p} \sqrt{\Delta Teov^2 + \Delta Tp^2 + 2\Delta Teov \Delta Tp \cos(\alpha - \beta)} \cos(\omega pt - \gamma) \quad (5)$$

The rotational speed amplitude $\Delta\omega mv$, which is the amplitude of the rotational speed vibration $\omega mv$, is derived from this formula, and indicated by the following formula:

$$\Delta\omega mv = \frac{1}{Jm\omega p} \sqrt{\Delta Teov^2 + \Delta Tp^2 + 2\Delta Teov \Delta Tp \cos(\alpha - \beta)} \quad (6)$$

Therefore, it is found from the formulas (4) and (6) that the rotational speed amplitude $\Delta Tov$ is proportional to the amplitude $\Delta Tov$ of the total torque vibration. In addition, it is found that the rotational speed amplitude $\Delta Tov$ is proportional to the amplitude $\Delta Tov$ of the total torque vibration also from the fact that the gain decreases in proportion to an increase in vibration frequency $\omega p$ in the Bode diagram of the characteristics of transfer from the output torque Te of the engine E to the rotational speed $\omega m$ of the rotary electric machine MG shown in FIG. 14A, as with the torque transfer characteristics shown in FIG. 14B.

The characteristics of the amplitude $\Delta Tov$ of the total torque vibration and the rotational speed amplitude $\Delta\omega mv$ with respect to the phase difference $\alpha-\beta$ between the phase $\alpha$ of the cancellation vibration torque command and the phase $\beta$ of the transfer torque vibration are shown in FIG. 7.

It is found that the amplitude $\Delta Tov$ and the amplitude $\Delta\omega mv$ are minimum when the phase difference $\alpha-\beta$ is $\pi$, and that the amplitude $\Delta Tov$ and the amplitude $\Delta\omega mv$ increase when the phase difference $\alpha-\beta$ varies in the advance (increase) direction or in the delay (decrease) direction with respect to $\pi$.

In the case where the amplitude $\Delta Tp$ of the cancellation vibration torque command is equal to the amplitude $\Delta Teov$ of the transfer torque vibration, the amplitude $\Delta Tov$ and the amplitude $\Delta\omega mv$ are minimum at zero when the phase difference $\alpha-\beta$ is $\pi$. In the case where the amplitude $\Delta Tp$ does not match the amplitude $\Delta Teov$, on the other hand, the amplitude $\Delta Tov$ and the amplitude $\Delta\omega mv$ are minimum at a value more than zero when the phase difference $\alpha-\beta$ is $\pi$.

Thus, it is found that the amplitude $\Delta Tov$ and the amplitude $\Delta\omega mv$ can be minimized by varying the phase $\alpha$ of the cancellation vibration torque command such that the phase difference $\alpha-\beta$ becomes $\pi$, irrespective of whether or not the amplitude $\Delta Tp$ of the cancellation vibration torque command matches the amplitude $\Delta Teov$ of the transfer torque vibration. That is, the phase $\alpha$ of the cancellation vibration torque command may be varied so as to match $\pi+\beta$.

It is also found that the amplitude $\Delta Tov$ of the total torque vibration can be minimized by minimizing the rotational speed amplitude $\Delta\omega mv$, since the rotational speed amplitude $\Delta\omega mv$ and the amplitude $\Delta Tov$ of the total torque vibration are proportional to each other, even in the case where no torque sensor is provided and the total torque To may not be directly measured.

Figure 9:
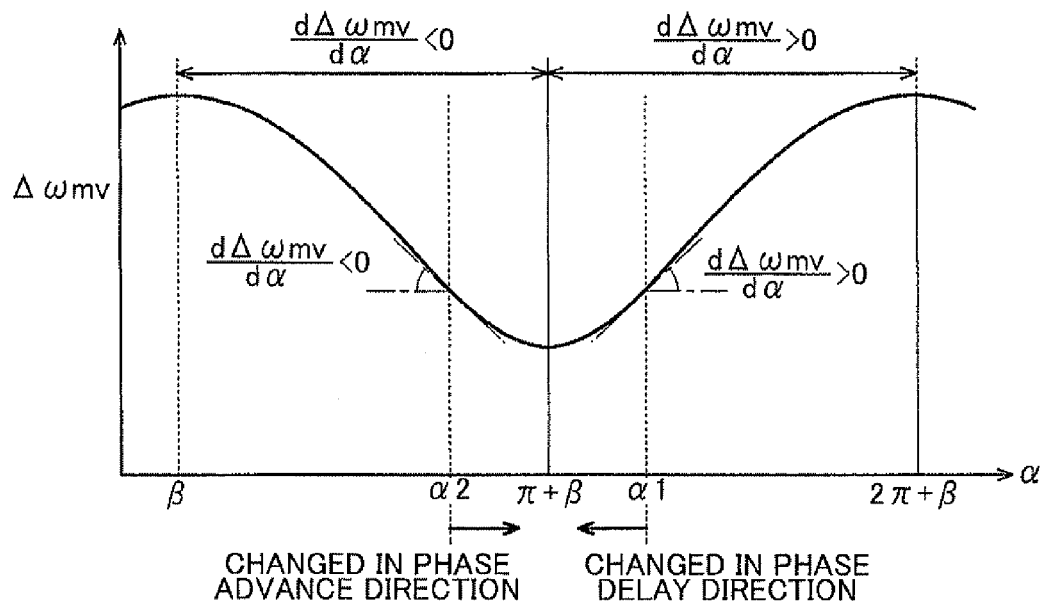
FIG. 9 is a graph showing the relationship between the phase of a cancellation vibration torque command and the rotational speed amplitude of the rotary electric machine according to the embodiment of the present invention.

As shown in FIG. 9, in the case where the phase $\alpha$ of the cancellation vibration torque command is more than $\pi+\beta$ (on the phase advance side), for example the phase $\alpha$ is $\alpha 1$, it is necessary to vary the phase $\alpha$ of the cancellation vibration torque command in the phase delay direction (decrease direction) in order to decrease the rotational speed amplitude $\Delta\omega mv$ and the amplitude $\Delta Tov$ of the total torque vibration. On the other hand, in the case where the phase $\alpha$ of the cancellation vibration torque command is less than $\pi+\beta$ (on the phase delay side), for example the phase $\alpha$ is $\alpha 2$, it is necessary to vary the phase $\alpha$ of the cancellation vibration torque command in the phase advance direction (increase direction) in order to decrease the rotational speed amplitude $\Delta\omega mv$ and the amplitude $\Delta Tov$ of the total torque vibration.

Therefore, it is necessary to reverse the phase adjustment direction for the phase $\alpha$ of the cancellation vibration torque command depending on whether the phase $\alpha$ is on the phase advance side or on the phase delay side with respect to $\pi+\beta$.

3-4-3. Variations in Phase of Transfer Torque Vibration

In grasping the relative phase of the phase $\alpha$ of the cancellation vibration torque command with respect to $\pi+\beta$, the phase $\alpha$ of the cancellation vibration torque command can be controlled comparatively accurately by the rotary electric machine control unit 32. On the other hand, the phase $\beta$ of the transfer torque vibration may not be measured easily in the case where no torque sensor is provided, and may vary because of factors of variations to be discussed later. Therefore, the relative phase may not be grasped easily. If the relative phase is not grasped, the phase adjustment direction, that is, whether to vary the phase $\alpha$ of the cancellation vibration torque command in the phase advance direction or in the phase delay direction in order to minimize the rotational speed amplitude $\Delta\omega mv$ and the amplitude $\Delta Tov$ of the total torque vibration, may not be decided, and the phase $\alpha$ of the cancellation vibration torque command may not be varied.

Figure 8:
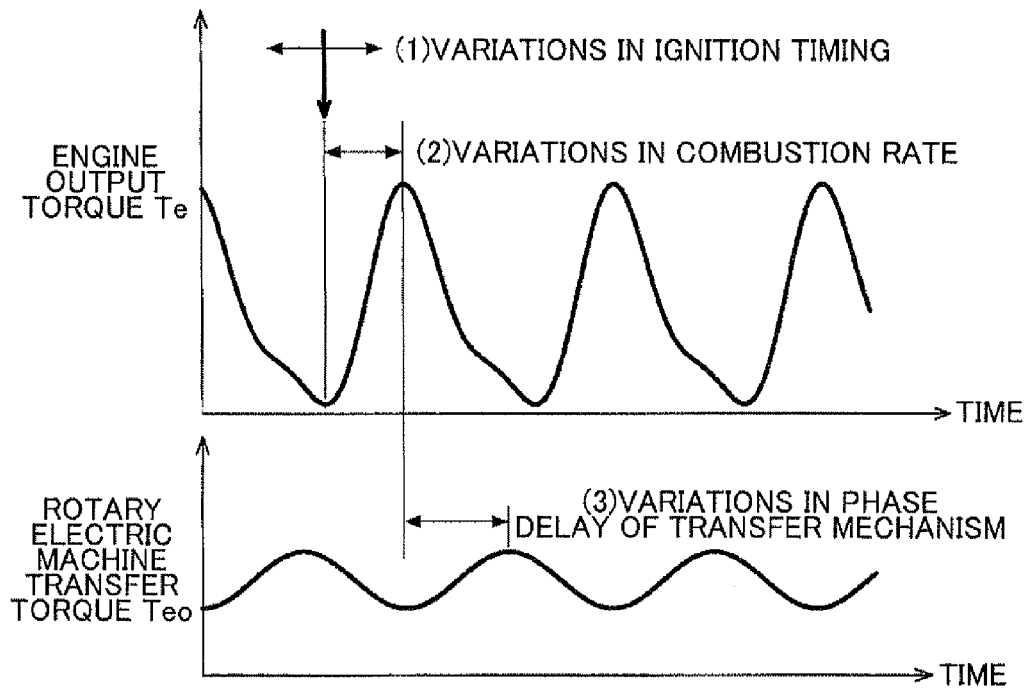
FIG. 8 illustrates factors of variations in phase of the transfer torque vibration according to the embodiment of the present invention.

As shown in FIG. 8, the factors of variations in phase $\beta$ of the transfer torque vibration include (1) variations in ignition timing, (2) variations in combustion rate, and (3) variations in phase delay of the first power transfer mechanism.

The variations in ignition timing (1) are caused by changes in ignition timing made by the engine control device 31 or the like. The engine control device 31 may change the ignition timing to ignition timing set for each drive operation point when the drive operation point, such as the rotational speed $\omega e$ and the output torque Te of the engine E, is varied, and may change the ignition timing in the delay direction or in the advance direction in real time through knocking prevention control. When the ignition timing is varied in the phase advance direction or in the phase delay direction, the phase of the output torque vibration Tev is also varied in accordance with the amount of variation in ignition timing. In turn, the phase of the transfer torque vibration Teov is varied in accordance with the amount of variation in phase of the output torque vibration Tev.

The variations in combustion rate (2) are caused by variations in amount of recirculated exhaust gas in the combustion chamber, variations in flow in the combustion chamber, variations in ignition timing, or the like. The variations in combustion rate accordingly cause variations in phase of the output torque vibration Tev, which in turn cause variations in phase of the transfer torque vibration Teov.

The variations in phase delay of the first power transfer mechanism (3) are caused by variations in torsional spring constant and viscous friction coefficient of a damper or the like. The variations in phase delay accordingly cause variations in phase of the transfer torque vibration Teov.

Among the above factors, the variations in ignition timing (1) may be grasped by the rotary electric machine control unit 32 through communication with the engine control device 31 or the like. Therefore, the torque vibration cancellation control section 40 can vary the phase α of the cancellation vibration torque command in accordance with the variations in ignition timing in a feedforward manner as discussed later.

The phase α of the cancellation vibration torque command is also varied more or less, especially at a high rotational speed, because of a computation delay since a change made to the phase α of the cancellation vibration torque command in the rotary electric machine control unit 32 until the change is reflected in drive of the inverter IN, or the like.

Figure 10:
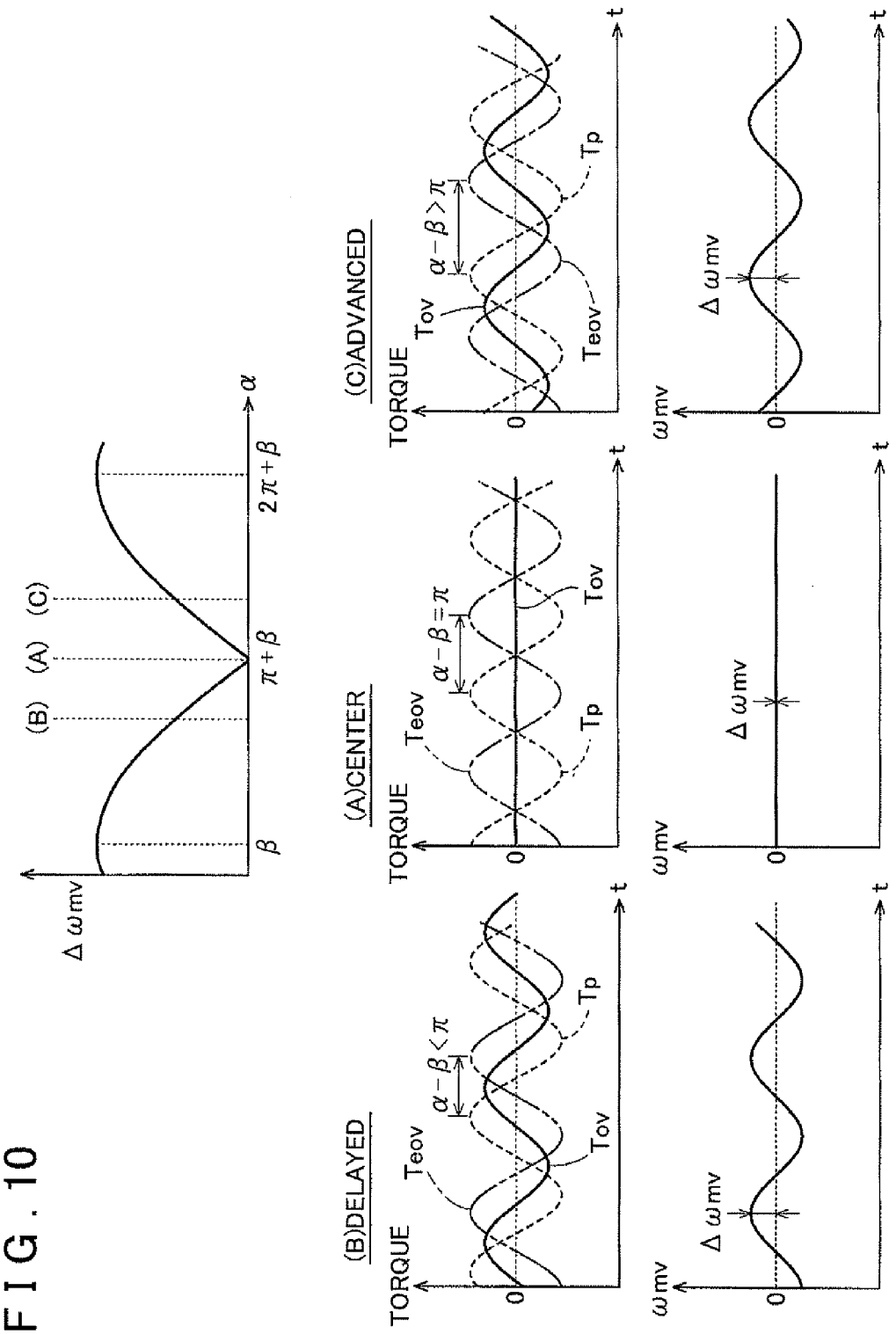
FIG. 10 illustrates the relationship between the phase of the cancellation vibration torque command and the rotational speed vibration of the rotary electric machine according to the embodiment of the present invention.

The waveform of the total torque vibration Tov in the case where the phase α is on the phase advance side with respect to π+β by a predetermined angle as shown in FIG. 10C and the waveform of the total torque vibration Tov in the case where the phase α is on the phase delay side with respect to π+β by the predetermined angle as shown in FIG. 10 have similar waveforms. Therefore, the rotational speed amplitude ωmv of the rotary electric machine MG also has a similar waveform. Therefore, it is not easy to determine, on the basis of the waveform of the rotational speed ωm of the rotary electric machine MG, whether the phase α of the cancellation vibration torque command is on the phase advance side or on the phase delay side with respect to π+β.

3-4-4. Decision on Phase Adjustment Direction

In the embodiment, in order to address the above-described issue that the relative phase may not be directly measured, the phase decision section 42 decides the phase adjustment direction so as to decrease the rotational speed amplitude Δωmv on the basis of variations in rotational speed amplitude Δωmv, which is derived on the basis of the rotational speed ωm of the rotary electric machine MG, and varies the phase α of the cancellation vibration torque command in the decided phase adjustment direction.

The decision on the phase adjustment direction performed by the phase decision section 42 will be described with reference to FIG. 9.

In the case where the phase α of the cancellation vibration torque command is more than π+β (on the phase advance side), for example in the case where the phase α is α1, a phase control result dΔωmv/dα, which is the slope of the rotational speed amplitude Δωmv with respect to the phase α, is positive (more than 0). On the other hand, in the case where the phase α of the cancellation vibration torque command is less than π+β (on the phase delay side), for example in the case where the phase α is α2, the phase control result dΔωmv/dα is negative (less than 0). Therefore, it can be determined whether the phase α of the cancellation vibration torque command is on the phase advance side or on the phase delay side with respect to π+β on the basis of whether the phase control result dΔωmv/dα is positive or negative, allowing decision on the phase adjustment direction.

Figure 12:
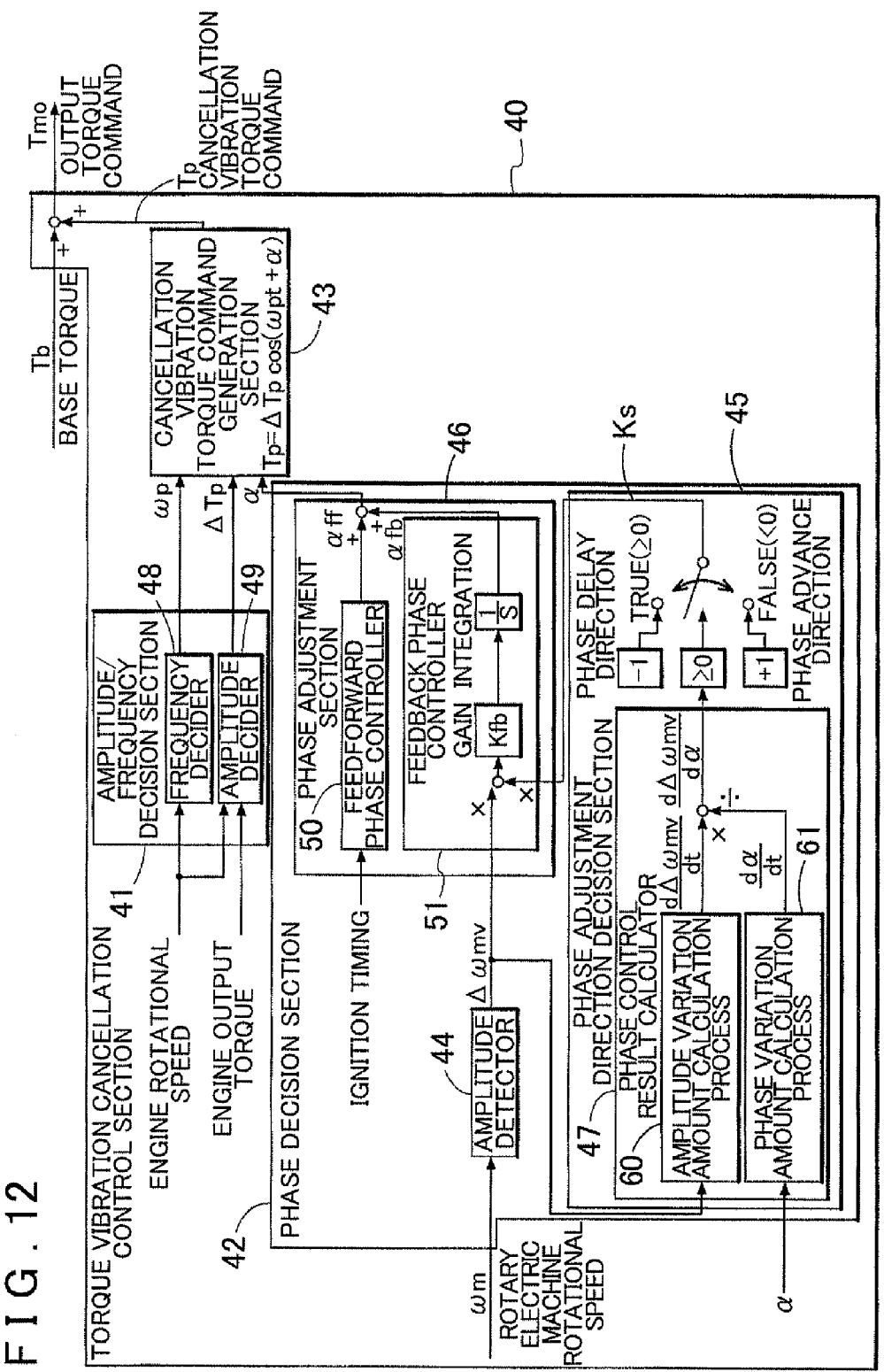
FIG. 12 is a block diagram showing the configuration of the torque vibration cancellation control section according to the embodiment of the present invention.

In the embodiment, as shown in FIG. 12, the phase decision section 42 calculates the phase control result dΔωmv/dα, which is the slope of the rotational speed amplitude Δωmv with respect to the phase α of the cancellation vibration torque command, on the basis of variations in rotational speed amplitude Δωmv. In the case where the phase control result dΔωmv/dα is positive, the phase decision section 42 decides the phase adjustment direction as the phase delay direction to vary the phase α of the cancellation vibration torque command in the phase delay direction. In the case where the phase control result dΔωmv/dα is negative, meanwhile, the phase decision section 42 decides the phase adjustment direction as the phase advance direction to vary the phase α of the cancellation vibration torque command in the phase advance direction.

In the example, the phase decision section 42 calculates the phase control result dΔωmv/dα by dividing an amount of variation dΔωmv/dt in rotational speed amplitude Δωmv per unit time by an amount of variation dα/dt in phase α of the cancellation vibration torque command per unit time.

In the example shown in FIG. 12, the phase decision section 42 includes a phase adjustment direction decision section 45 that decides the phase adjustment direction. The phase adjustment direction decision section 45 includes a phase control result calculator 47 that calculates the phase control result dΔωmv/da.

The phase control result calculator 47 performs an amplitude variation amount calculation process 60 on the basis of the rotational speed amplitude Δωmv detected by an amplitude detector 44 to calculate the amount of variation dΔωmv/dt in rotational speed amplitude Δωmv per unit time. The phase control result calculator 47 also performs a phase variation amount calculation process 61 to calculate the amount of variation dα/dt in phase α of the cancellation vibration torque command per unit time. The phase control result calculator 47 then divides the amount of variation dΔωmv/dt by the amount of variation dα/dt to calculate the phase control result dΔωmv/da.

In the case where a digital computation process is performed, the amplitude variation amount calculation process 60 and the phase variation amount calculation process 61 are executed for each predetermined computation cycle ΔT1. In the amplitude variation amount calculation process 60, the amount of variation dΔωmv/dt in rotational speed amplitude Δωmv per unit time is calculated on the basis of the amount of variation in rotational speed amplitude Δωmv during the computation cycle ΔT1 as indicated by the following formula. In the phase variation amount calculation process 61, the amount of variation dα/dt in phase α of the cancellation vibration torque command per unit time is calculated on the basis of the amount of variation in phase α of the cancellation vibration torque command during the computation cycle ΔT1 as indicated by the following formula.

$$\frac{d\Delta \omega mv}{dt} = \frac{\Delta \omega mv(n) - \Delta \omega mv(n-1)}{\Delta T1} \quad (7)$$

$$\frac{d\alpha}{dt} = \frac{\alpha(n-1) - \alpha(n-2)}{\Delta T1}$$

Here, (n) indicates a value calculated in the current computation timing, (n−1) indicates a value calculated in the preceding computation timing (ΔT1 before the current computation timing), and (n−2) indicates a value calculated in the second preceding computation timing (2ΔT1 before the current computation timing). In the formulas, the values in the preceding (n−1) and second preceding (n−2) computation timings are used for the phase α of the cancellation vibration torque command. This is because the value in the current (n) computation timing is a value that is finally decided by the phase decision section 42 on the basis of the computation results from the formulas (7), and for the purpose of calculating the control result of the phase α. That is, the control result of the phase α(n−1) provided in a command in the preceding computation timing is included in the rotational speed amplitude Δωmv(n) detected in the current computation timing, and the control result of the phase α(n−2) provided in a command in the second preceding computation timing is included in the rotational speed amplitude Δωmv (n−1) detected in the preceding computation timing. The rotary electric machine control unit 32 is configured to store in the RAM values calculated in the previous computation timings, such as the preceding computation timing and the second preceding computation timing, in accordance with the content of the computation process. In order to allow detection of the control result of the rotational speed amplitude Δωmv with respect to variations in phase α of the cancellation vibration torque command, the computation cycle ΔT1 is set to a cycle sufficiently longer than the cycle of vibration (2π/ωp) of the rotational speed ωm of the rotational speed MG obtained by the transfer torque vibration Teov (for example, a cycle of about ten times the vibration cycle).

In the example shown in FIG. 12, the phase adjustment direction decision section 45 calculates the phase adjustment direction as +1 or −1 to have the phase adjustment direction reflected in variations in phase α of the cancellation vibration torque command. That is, in the case where the phase control result dΔωmv/dα is zero or more, the phase adjustment direction decision section 45 decides the phase adjustment direction as the phase delay direction, and sets a sign gain Ks to −1 to decrease the phase α of the cancellation vibration torque command. On the other hand, in the case where the phase control result dΔωmv/dα is less than zero, the phase adjustment direction decision section 45 decides the phase adjustment direction as the phase advance direction, and sets the sign gain Ks to +1 to increase the phase α of the cancellation vibration torque command. The phase adjustment direction decision section 45 may be adapted to set the sign gain Ks to −1 in the case where the phase control result dΔωmv/dα is more than zero, and to set the sign gain to +1 in the case where the phase control result dΔωmv/dα is zero or less.

In order to calculate the slope of the rotational speed amplitude Δωmv with respect to the phase α of the cancellation vibration torque command, it is necessary to vary the phase α of the cancellation vibration torque command to detect variations in rotational speed amplitude Δωmv. Therefore, the phase adjustment direction decision section 45 is configured to decide the phase adjustment direction as either the phase advance direction or the phase delay direction and vary the phase α of the cancellation vibration torque command in either direction. That is, the phase adjustment direction decision section 45 is configured not to decide to set the sign gain Ks to zero in the case where the phase control result dΔωmv/dα is zero so that the phase adjustment direction is not decided as a direction that will not vary the phase α of the cancellation vibration torque command.

3-4-5. Detection of Rotational Speed Amplitude

As shown in FIG. 12, the phase decision section 42 also includes the amplitude detector 44 which detects the rotational speed amplitude Δωmv on the basis of the rotational speed ωm of the rotary electric machine MG.

In the embodiment, the amplitude detector 44 performs a Fourier transform computation process on the rotational speed ωm of the rotary electric machine MG to calculate the amplitude of the vibration frequency ωp, and sets the amplitude of the vibration frequency ωp to the rotational speed amplitude Δωmv.

In the example, the amplitude detector 44 performs a discrete Fourier transform computation process such as a fast Fourier transform as the Fourier transform computation process. For example, the amplitude detector 44 samples the rotational speed ωm of the rotary electric machine MG at a cycle sufficiently shorter than the cycle of vibration (2π/ωp) of the rotational speed ωm of the rotary electric machine MG obtained by the transfer torque vibration Teov, and performs a discrete Fourier computation process on a plurality of values sampled during the computation cycle ΔT1 for each computation cycle ΔT1. The computation cycle ΔT1 is set to a cycle sufficiently longer than the vibration cycle (2π/ωp) (for example, a cycle of about ten times the vibration cycle) as described above, in order to secure the accuracy of the Fourier transform as well. The amplitude detector 44 may be adapted to perform a discrete Fourier transform computation process on values sampled during a period an integer number of times the vibration cycle (2π/ωp), among the values sampled during the computation cycle ΔT1. The computation cycle ΔT1 is preferably set to an integer number of times the vibration cycle (2π/ωp), and may be variable.

This allows detection of the rotational speed amplitude Δωmv caused by the output torque vibration Tev of the engine E without being affected by vibration in a frequency band different from the vibration frequency ωp, such as shaft torsional vibration, since the rotational speed amplitude Δωmv is set to the amplitude of the vibration cycle ωp obtained through a Fourier transform.

Alternatively, the amplitude detector 44 may be adapted to perform a band-pass filtering process, which allows passage of a band of the vibration frequency ωp, on the rotational speed ωm of the rotary electric machine MG at a cycle sufficiently shorter than the computation cycle ΔT1 and detect a maximum value and a minimum value of the rotational speed after the band-pass filtering process during the computation cycle ΔT1 for each computation cycle ΔT1 to set the rotational speed amplitude Δωmv on the basis of the deviation between the detected maximum value and minimum value. This also allows detection of the rotational speed amplitude Δωmv caused by the output torque vibration Tev of the engine E without being affected by vibration in a frequency band different from the vibration frequency ωp, such as shaft torsional vibration.

Alternatively, the amplitude detector 44 may be adapted to detect the rotational speed amplitude Δωmv on the basis of the amount of variation in rotational speed ωm of the rotary electric machine MG with respect to the average value of the rotational speed ωm of the rotary electric machine MG. For example, the amplitude detector 44 may perform a low-pass filtering process, which allows passage of a frequency lower than the vibration frequency ωp, on the rotational speed ωm of the rotary electric machine MG to calculate the average value of the rotational speed ωm of the rotary electric machine MG. A first-order delay filtering process, a moving-average computation process, or the like may be used as the low-pass filtering process. In the moving average process, an averaging process may be performed on values of the rotational speed ωm of the rotary electric machine MG sampled during an averaging period an integer number of times the vibration cycle (2π/ωp) in order to improve the accuracy over a short averaging period. Then, the amplitude detector 44 may calculate the deviation of the rotational speed ωm of the rotary electric machine MG with respect to the average value of the rotational speed ωm of the rotary electric machine MG and calculates the maximum value of the absolute value of the deviation during the computation cycle ΔT1 for each computation cycle ΔT1 to set the rotational speed amplitude Δωmv on the basis of the calculated maximum value.

Alternatively, the amplitude detector 44 may be adapted to detect the maximum value and the minimum value of the rotational speed ωm of the rotary electric machine MG during the computation cycle ΔT1 for each computation cycle ΔT1 to set the rotational speed amplitude Δωmv on the basis of the deviation between the detected maximum value and minimum value.

3-4-6. Variations in Phase of Vibration Torque Command

As shown in FIG. 12, the phase decision section 42 also includes a phase adjustment section 46 that varies the phase α of the cancellation vibration torque command in the phase adjustment direction.

In the embodiment, the phase adjustment section 46 is configured to vary the phase a of the cancellation vibration torque command in the phase adjustment direction in accordance with the magnitude of the rotational speed amplitude Δωmv.

3-4-6-1. Feedback Phase Control

In the example, the phase adjustment section 46 includes a feedback phase controller 51. The feedback phase controller 51 varies the phase α of the cancellation vibration torque command in the phase adjustment direction by performing feedback control on the basis of the magnitude of the rotational speed amplitude Δωmv. In the example of FIG. 12, the amount of variation in phase α of the cancellation vibration torque command calculated by the feedback phase controller 51 is defined as a feedback phase variation amount αfb. In the example shown in FIG. 12, the feedback control includes integral control. That is, the feedback phase controller 51 multiplies the magnitude of the rotational speed amplitude Δωmv by an integral gain Kfb in the phase adjustment direction and performs an integral computation process on the resulting product to set the resulting value to the feedback phase variation amount αfb. Various feedback control other than integral control such as proportional-integral control, for example, may be used as the feedback control.

The integral gain Kfb may be configured to be changeable in accordance with the shift speed established in the speed change mechanism TM. This is because the gain of variations in rotational speed ωm of the rotational speed MG with respect to variations in output torque Tm of the rotary electric machine MG differs in accordance with variations in speed ratio. This is also found from the fact that the gain in the engine drive range is vertically offset in accordance with changes in shift speed in the Bode diagram of the characteristics of transfer from the output torque Te of the engine E to the rotational speed ωm of the rotary electric machine MG shown in FIG. 14A.

In the example shown in FIG. 12, the phase adjustment direction decision section 45 is configured to calculate the sign gain Ks, which is +1 or −1, as the phase adjustment direction. Thus, the feedback phase controller 51 is configured to perform a feedback computation process (integral computation process) on the basis of a value obtained by multiplying the rotational speed amplitude Δωmv by the sign gain Ks, which is +1 or −1, to vary the phase α of the cancellation vibration torque command in the phase adjustment direction.

In the case where the rotary electric machine control unit 32 can detect the timing of the moment of ignition through communication with the engine control device 31, detection of an electrical signal supplied to a coil of a spark plug, or the like, the feedback phase controller 51 may be adapted to set an initial value of the feedback phase variation amount αfb at the start of the torque vibration cancellation control, that is, an initial value for the integral computation process, on the basis of the detected ignition timing. Specifically, the initial value αfb0 for the integral computation process is set such that ωp×t+α in the formula (2) at the time when the ignition timing is detected (for example, at an elapsed time t1) is a predetermined initial phase A1. That is, the initial value αfb0 for the integral computation process is set to the initial phase A1−ωp×t1. As discussed later, an angle based on a rotational angle θm of the rotary electric machine MG may be used in place of ωp×t. In the case where an elapsed time t is reset to zero when the ignition timing is detected, the initial value αfb0 for the integral computation process is set to the initial phase A1. The initial phase A1 is set in advance on the basis of the relationship of the phase α of the cancellation vibration torque command that minimizes the rotational speed amplitude Δωmv with respect to the ignition timing.

In the case where the engine separation clutch CL is disengaged and engaged, the relative phase of rotation of the engine E and rotation of the rotary electric machine MG varies. Therefore, also in this case, an initial value for the integral computation process may be set as described above.

3-4-6-2. Feedforward Phase Control

The phase decision section 42 also includes a feedforward phase controller 50 that varies the phase α of the cancellation vibration torque command on the basis of the ignition timing of the engine E.

The feedforward phase controller 50 varies the phase α of the cancellation vibration torque command on the basis of the amount of angular variation in ignition timing. In the example of FIG. 12, the amount of variation in phase α of the cancellation vibration torque command calculated by the feedforward phase controller 50 is defined as a feedforward phase variation amount αff.

In case of a spark-ignition engine, the ignition timing is defined as the timing when a spark is generated from the spark plug. The amount of angular variation in ignition timing may be defined as an amount of angular variation calculated on the basis of information on the relative ignition angle with respect to the top dead center of the piston transmitted from the engine control device 31 through communication, or as an amount of angular variation calculated on the basis of ignition timing detected from an electrical signal supplied to the coil of the spark plug or the like. The ignition timing may be defined as combustion start timing. For a compression self-ignition engine such as a diesel engine, as described above, the ignition timing may be defined as timing to inject fuel into the combustion chamber. In the case where a pressure sensor that detects the pressure in the combustion chamber is provided, the combustion start timing may be determined on the basis of a rise in pressure. In order to simulate a response delay of the first power transfer mechanism since variations in phase of the output torque vibration Tev of the engine E due to variations in ignition timing until variations in phase β of the transfer torque vibration Teov, the feedforward phase controller 50 may be adapted to perform a response delay process, which corresponds to the response delay of the first power transfer mechanism, on the amount of angular variation in ignition timing or the feedforward phase variation amount αff.

The feedforward phase controller 50 may define the amount of angular variation in ignition timing as an amount of angular variation from a reference angle, or as an amount of angular variation from the angle of the ignition timing in the preceding computation timing to the angle of the ignition timing in the current computation timing. The reference angle may be set to the angle of the ignition timing detected at the start of the torque vibration cancellation control.

The phase adjustment section 46 sets the phase $\alpha$ of the cancellation vibration torque command to a value obtained by adding the feedback phase variation amount $\alpha fb$ and the feedforward phase variation amount $\alpha ff$.

3-4-7. Decision on Amplitude and Frequency of Cancellation Vibration Torque Command As described above, the amplitude/frequency decision section 41 decides the amplitude $\Delta Tp$ and the frequency $\omega p$ of the cancellation vibration torque command on the basis of at least the rotational speed $\omega e$ of the engine E. In the embodiment, the rotational speed $\omega e$ of the engine E and the rotational speed $\omega m$ of the rotary electric machine MG are generally the same as each other except for their vibration components. Therefore, the amplitude/frequency decision section 41 may be adapted to use the rotational speed $\omega m$ of the rotary electric machine MG in place of the rotational speed $\omega e$ of the engine E.

In the embodiment, as shown in FIG. 12, the amplitude/frequency decision section 41 includes a frequency decider 48 and an amplitude decider 49.

The frequency decider 48 decides the frequency $\omega p$ of the cancellation vibration torque command on the basis of the rotational speed $\omega e$ of the engine E. Specifically, as described above, for a 4-cycle engine with N cylinders, the frequency $\omega p$ of the cancellation vibration torque command is set as $\omega p=(N/2) \times \omega e$. For a 4-cylinder engine, for example, the frequency $\omega p$ of the cancellation vibration torque command is set as $\omega p=2 \times \omega e$.

The amplitude decider 49 decides the amplitude $\Delta Tp$ of the cancellation vibration torque command on the basis of the rotational speed $\omega e$ and the output torque Te of the engine E.

Figure 13A:
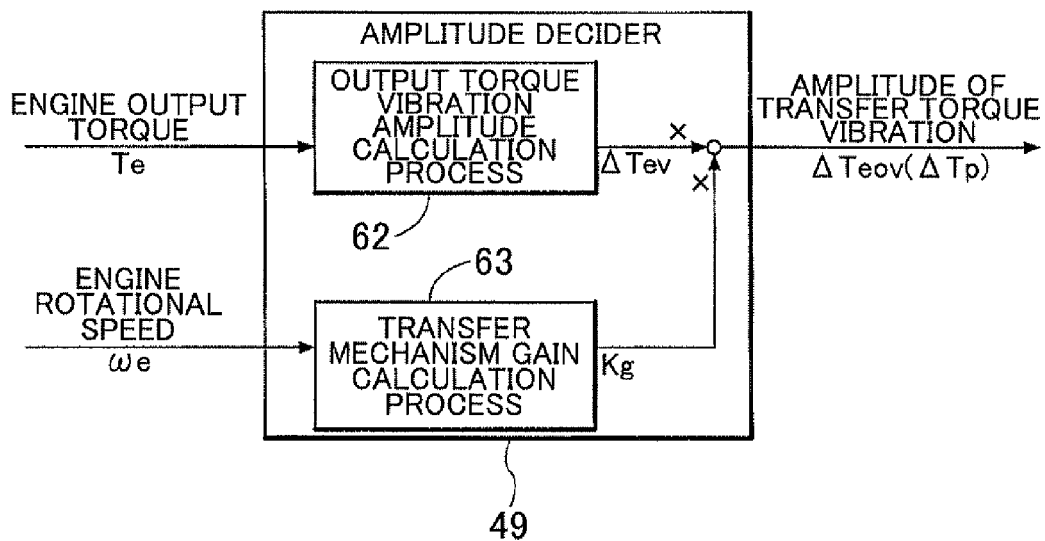
Figure 13B:
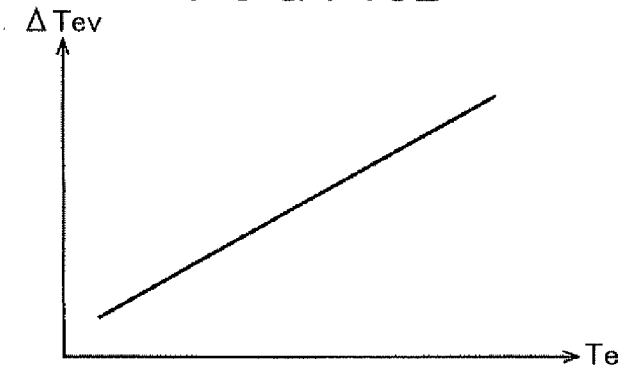

In the example, as shown in FIG. 13A, the amplitude decider 49 performs an output torque vibration amplitude calculation process 62 on the basis of the output torque Te of the engine E to calculate an amplitude $\Delta Tev$ of the output torque vibration of the engine E. As described above, the amplitude $\Delta Tev$ of the output torque vibration is proportional to the output torque Te (average value) of the engine E. Therefore, the amplitude decider 49 includes a characteristics map for the output torque vibration, such as that shown in FIG. 13B, in which the characteristics of the amplitude $\Delta Tev$ of the output torque vibration with respect to the output torque Te (average value) of the engine E are set, and calculates the amplitude $\Delta Tev$ of the output torque vibration on the basis of the characteristics map and the output torque Te (average value) of the engine E.

Figure 13C:
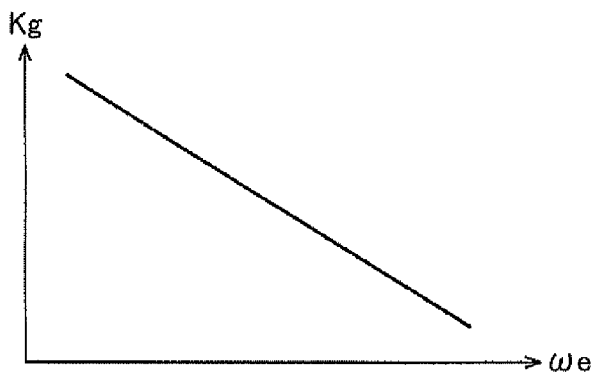

The amplitude decider 49 also performs a transfer mechanism gain calculation process 63 on the basis of the rotational speed $\omega e$ of the engine E to calculate a gain Kg of the transfer mechanism. The gain Kg of the transfer mechanism is the gain of the torque transfer characteristics of the first power transfer mechanism at the vibration cycle $\omega p$ corresponding to the rotational speed $\omega e$ of the engine E as shown in FIGS. 6 and 14B. The amplitude decider 49 includes a characteristics map for the gain Kg, such as that shown in FIG. 13C, in which the characteristics of the gain Kg of the transfer mechanism with respect to the rotational speed $\omega e$ of the engine E are set, and calculates the gain Kg of the transfer mechanism on the basis of the characteristics map and the rotational speed $\omega e$ of the engine E. As shown in FIG. 14B, the gain of the torque transfer characteristics of the first power transfer mechanism varies in accordance with the shift speed. Therefore, the characteristics map for the gain Kg may be provided for each shift speed that may be established in the speed change mechanism TM to calculate the gain Kg of the transfer mechanism switchably using the characteristics map for the shift speed established in the speed change mechanism TM.

Then, the amplitude decider 49 multiplies the amplitude $\Delta Tev$ of the transfer torque vibration and the gain Kg of the transfer mechanism to calculate the amplitude $\Delta Teov$ of the transfer torque vibration, and sets the amplitude $\Delta Teov$ of the transfer torque vibration to the amplitude $\Delta Tp$ of the cancellation vibration torque command.

Alternatively, the amplitude decider 49 includes a three-dimensional characteristics map in which the characteristics of the amplitude $\Delta Tp$ of the cancellation vibration torque command with respect to the output torque Te and the rotational speed $\omega e$ of the engine E are set, and calculates the amplitude $\Delta Tp$ of the cancellation vibration torque command on the basis of the characteristics map and the output torque Te and the rotational speed $\omega e$ of the engine E.

3-4-8. Generation of Cancellation Vibration Torque Command

The cancellation vibration torque command generation section 43 generates the cancellation vibration torque command Tp on the basis of the amplitude $\Delta Tp$, the frequency $\omega p$, and the phase $\alpha$ of the cancellation vibration torque command.

In the embodiment, the cancellation vibration torque command generation section 43 generates the cancellation vibration torque command Tp in accordance with the formula (2). In the case where the rotational angle $\theta m$ of the rotary electric machine MG can be measured, information on the rotational angle $\theta m$ of the rotary electric machine MG may be used in place of the frequency $\omega p \times$ the elapsed time t ($\omega p \times t$) in the formula (2). For example, for a 4-cycle engine with N cylinders, $\theta m \times (N/2)$ may be used in place of $\omega p \times t$.

In the case where a decrease in amplitude from the output torque vibration Tev to the transfer torque vibration Teov caused by the first power transfer mechanism is small, for example, the second- and higher-order vibration components with respect to the vibration frequency $\omega p$ may be added to the cancellation vibration torque command Tp as indicated by the following formula:

$$Tp(t)=\Delta Tp \cos(\omega p\, t+\alpha)+\Delta Tp2 \cos(2\omega p\, t+\alpha)+ \Delta Tp3 \cos(3\omega p\, t+\alpha)+\ldots \quad (8)$$

In this case, the amplitude/frequency decision section 41 decides the amplitudes $\Delta Tp2$, $\Delta Tp3$, ... of the second- and higher-order vibration components in the same manner as the amplitude $\Delta Tp$ described above.

The rotary electric machine control unit 32 sets the output torque command value Tmo by adding the cancellation vibration torque command Tp to the base torque command value Tb, and controls the rotary electric machine MG so as to output the output torque Tm corresponding to the output torque command value Tmo.

3-4-9. Behavior of Torque Vibration Cancellation Control (without Feedforward Control)

Figure 15:
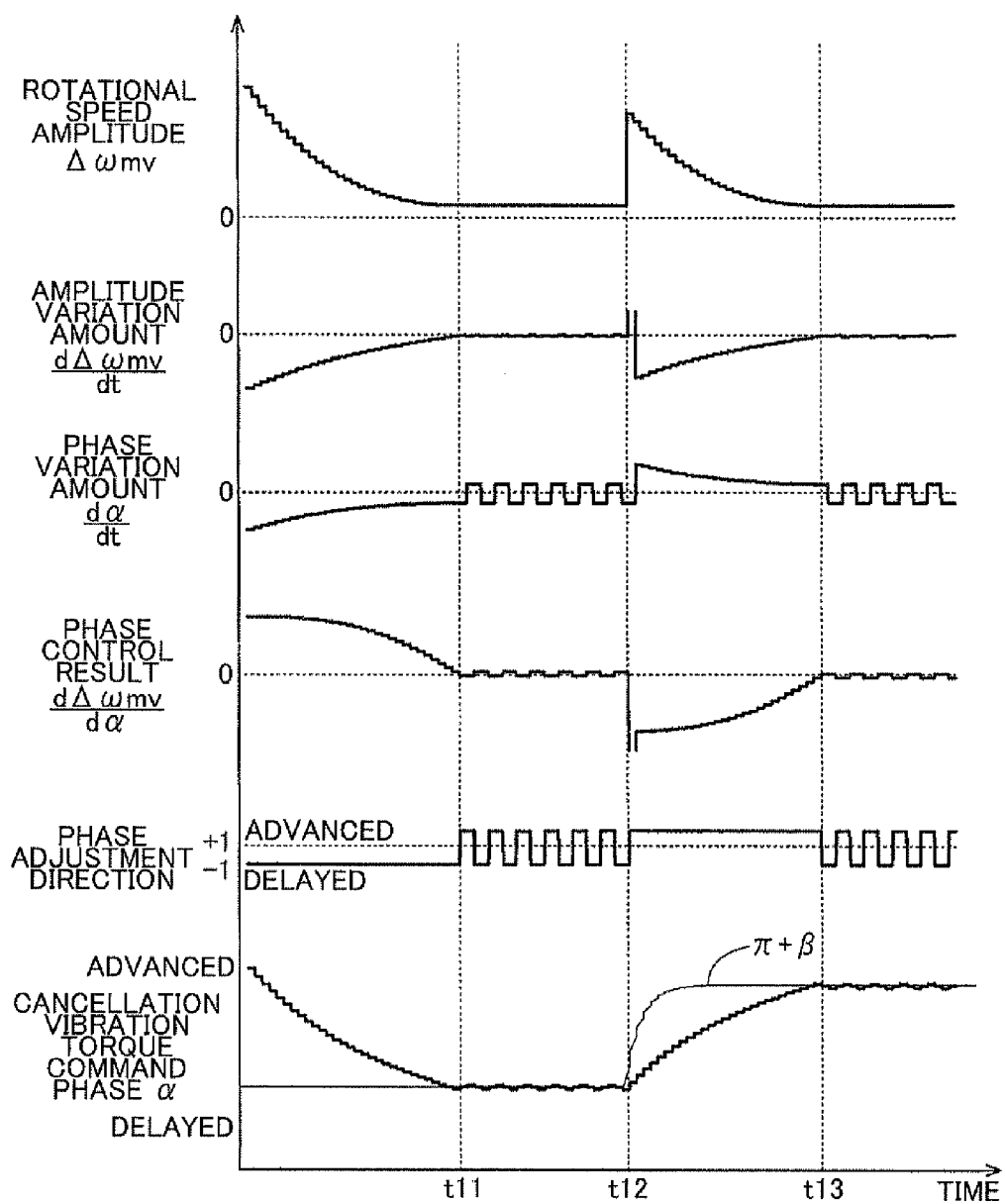
FIG. 15 is a time chart showing an example of torque vibration cancellation control according to the embodiment of the present invention in which feedforward correction is not executed.

Next, the behavior of the torque vibration cancellation control will be described on the basis of the time chart shown in the example of FIG. 15. In the example of FIG. 15, the phase $\alpha$ of the cancellation vibration torque command is set on the basis of only the feedback phase variation amount $\alpha fb$, without the feedforward phase controller 50 calculating the feedforward phase variation amount $\alpha ff$. The processes performed by the various sections of the phase decision section 42 are executed in sync with the computation cycle $\Delta T1$.

When the torque vibration cancellation control is started, the phase $\alpha$ of the cancellation vibration torque command is shifted to the phase advance side with respect to $\pi+\beta$. Therefore, the rotational speed amplitude $\Delta\omega mv$ is large. In addition, the phase adjustment direction is set to the phase delay direction (sign gain Ks=−1) so that the phase $\alpha$ will be varied in the phase delay direction (decrease direction). Therefore, the phase variation amount $d\alpha/dt$ is calculated as a negative value, and the phase $\alpha$ approaches $\pi+\beta$. Thus, the rotational speed amplitude $\Delta\omega mv$ decreases, and the amplitude variation amount $d\Delta\omega mv/dt$ is also calculated as a negative value. Therefore, the phase control result $d\Delta\omega mv/d\alpha$, which is calculated by dividing the amount of variation in amplitude $d\Delta\omega mv/dt$ by the amount of variation in phase $d\alpha/dt$, is calculated as a positive value. Therefore, the phase adjustment direction is decided as the phase delay direction (sign gain Ks=−1), which decreases the phase $\alpha$ and hence the rotational speed amplitude $\Delta\omega mv$.

When the phase $\alpha$ is decreased to the phase delay side with respect to $\pi+\beta$, the rotational speed amplitude $\Delta\omega mv$ is increased, the amplitude variation amount $d\Delta\omega mv/dt$ is brought into a positive value, and the phase control result $d\Delta\omega mv/d\alpha$ is brought into a negative value. The phase adjustment direction is reversed into the phase advance direction (sign gain Ks=+1) (time t11). When the phase adjustment direction is brought into the phase advance direction, the phase $\alpha$ increases, and the rotational speed amplitude $\Delta\omega mv$ decreases. Thus, the phase control result $d\Delta\omega mv/d\alpha$ is continuously calculated as a negative value, and the phase adjustment direction is maintained in the phase advance direction (sign gain Ks+1).

When the phase $\alpha$ is increased to the phase advance side with respect to $\pi+\beta$, the rotational speed amplitude $\Delta\omega mv$ is increased, the amplitude variation amount $d\Delta\omega mv/dt$ is brought into a positive value, and the phase control result $d\Delta\omega mv/d\alpha$ is brought into a positive value. The phase adjustment direction is reversed into the phase delay direction (sign gain Ks=−1), which decreases the phase $\alpha$ again.

In this way, the phase $\alpha$ is varied alternately to the phase advance side and to the phase delay side with respect to $\pi+\beta$ at the center to be feedback-controlled to be around $\pi+\beta$, as a result of which the rotational speed amplitude $\Delta\omega mv$ is maintained around its minimum value. Even in the case where the rotational speed amplitude $\Delta\omega mv$ is maintained around its minimum value, the phase $\alpha$ is varied to be on the phase advance side or on the phase delay side at all times, allowing calculation of the phase control result at all times. Therefore, even in the case where the phase $\beta$ of the transfer torque vibration is varied (time t12), variations in phase $\beta$ can be detected immediately to vary the phase $\alpha$.

Since the phase $\alpha$ is varied in accordance with the magnitude of the rotational speed amplitude $\Delta\omega mv$, the amount of variation in phase $\alpha$ is small in the case where the rotational speed amplitude $\Delta\omega mv$ is around its minimum value. Even if the phase $\alpha$ is varied alternately to the phase advance side and to the phase delay side with respect to $\pi+\beta$ at the center, the amount of variation in rotational speed amplitude $\Delta\omega mv$ is small and maintained around its minimum value. Since the phase $\alpha$ is varied in accordance with the magnitude of the rotational speed amplitude $\Delta\omega mv$, in the case where the rotational speed amplitude $\Delta\omega mv$ is large with the phase $\alpha$ shifted from $\pi+\beta$, the amount of variation in phase $\alpha$ is large, increasing the rate at which the phase $\alpha$ converges to $\pi+\beta$.

3-4-10. Behavior of Torque Vibration Cancellation Control (with Feedforward Control)

Figure 16:
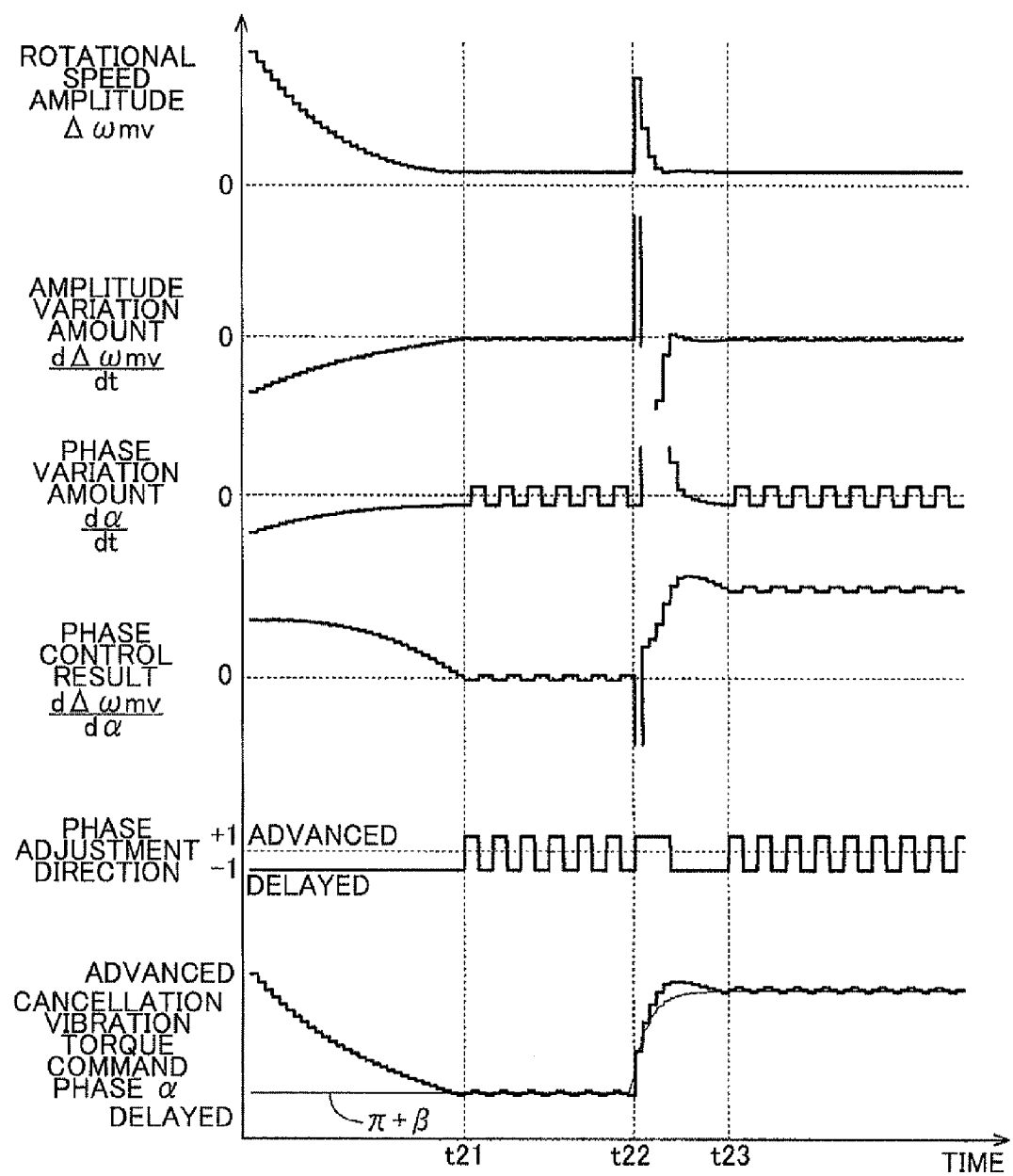
FIG. 16 is a time chart showing an example of torque vibration cancellation control according to the embodiment of the present invention in which feedforward correction is executed.

Next, FIG. 16 shows an example in which the phase $\alpha$ of the cancellation vibration torque command is set on the basis of not only the feedback phase variation amount $\alpha fb$ but also the feedforward phase variation amount $\alpha ff$.

In the example shown in FIG. 16, the feedforward phase variation amount $\alpha ff$ is varied in accordance with the amount of angular variation in ignition timing in the case where the phase $\beta$ of the transfer torque vibration is varied by variations in ignition timing (from time t22 to time t23). Therefore, the phase $\alpha$ is varied in accordance with variations in $\pi+\beta$ in a feedforward manner, and the rotational speed amplitude $\Delta\omega mv$ is decreased to its minimum value again over a short period after variations in phase $\beta$ of the transfer torque vibration. Therefore, the rate of convergence of the rotational speed amplitude $\Delta\omega mv$ can be increased with respect to variations in phase $\beta$ of the transfer torque vibration due to variations in ignition timing by performing feedforward phase control in accordance with the ignition timing.

Other Embodiments

Lastly, other embodiments of the present invention will be described. The configuration of each embodiment described below is not limited to its independent application, and may be applied in combination with the configuration of other embodiments unless any contradiction occurs.

(1) In the above embodiment, the control device 3 includes the plurality of control units 32 to 34, and the plurality of control units 32 to 34 include the plurality of functional sections 71 to 73, 77, 78, and 41 to 43 in a distributed manner. However, the present invention is not limited thereto. That is, the control device 3 may include the plurality of control units 32 to 34 integrated or separated in any combination. Also, the plurality of control units 32 to 34 may include the plurality of functional sections 71 to 73, 77, 78, and 41 to 43 that are distributed in any combination.

(2) In one preferred embodiment of the present invention, as opposed to the above embodiment, a friction engagement element that drivably couples and decouples the rotary electric machine MG and the wheels W to and from each other or a friction engagement element that brings a torque converter and input and output members of the torque converter into the direct engagement state may be provided separately from the speed change mechanism TM. In this case, these friction engagement elements may serve as the friction engagement device to be brought into the slip state in the operation point change control.

(3) In the above embodiment, the speed change mechanism TM is a stepped automatic transmission. However, the present invention is not limited thereto. That is, in one preferred embodiment of the present invention, the speed change mechanism TM may be a transmission other than a stepped automatic transmission, such as a continuously variable automatic transmission capable of continuously changing the speed ratio.

(4) In the above embodiment, one of the speed ratio change control and the slip control that causes a smaller reduction in energy efficiency of the vehicle drive device 1 is selected and decided to be executed as the operation point change control. However, the present invention is not limited thereto. That is, in one preferred embodiment of the present invention, only one of the speed ratio change control and the slip control may be decided to be executed as the operation point change control.

(5) In the above embodiment, the cancellation control execution determination section 72 determines whether or not the torque vibration cancellation control can be executed on the basis of the state of the rotary electric machine MG, the battery BT, and the inverter IN. However, the present invention is not limited thereto. That is, in one preferred embodiment of the present invention, the cancellation control execution determination section 72 may be configured to determine whether or not the torque vibration cancellation control can be executed on the basis of the state of only one or two of the rotary electric machine MG, the battery BT, and the inverter IN. Alternatively, it may be determined whether or not the torque vibration cancellation control can be executed on the basis of other conditions such as the vehicle speed, the rotary electric machine required torque, and the engine required torque. For example, it may be determined that the torque vibration cancellation control cannot be executed in the case where the vehicle speed is higher than a predetermined value. Also, it may be determined that the torque vibration cancellation control cannot be executed in the case where the rotary electric machine required torque is so close to the maximum output of the rotary electric machine MG that the rotary electric machine MG does not afford to output torque corresponding to the cancellation vibration torque command Tp.

(6) In the above embodiment, the reduction necessary range is prescribed in advance using both the rotational speed $\omega e$ and the output torque Te of the engine E. However, the present invention is not limited thereto. That is, in one preferred embodiment of the present invention, the reduction necessary range may be prescribed in advance using only the rotational speed $\omega e$ of the engine E.

The present invention may be suitably applied to a control device that controls a vehicle drive device in which a rotary electric machine is provided on a power transfer path connecting between an input member drivably coupled to an internal combustion engine and an output member drivably coupled to wheels.

What is claimed is:

1. A control device that controls a vehicle drive device in which a rotary electric machine is provided on a power transfer path connecting between an input member drivably coupled to an internal combustion engine and an output member drivably coupled to wheels, the control device comprising:
  a vibration reduction necessity determination section that determines whether or not a required drive operation point, which is a drive operation point defined on the basis of output torque and a rotational speed required for the internal combustion engine, falls within a reduction necessary range, which is prescribed in advance as a range in which it is necessary to reduce torque vibration transferred from the internal combustion engine to the rotary electric machine;
  a cancellation control execution determination section that determines whether or not torque vibration cancellation control, in which the rotary electric machine is caused to output torque for canceling the torque vibration, can be executed in the case where it is determined that the required drive operation point falls within the reduction necessary range; and
  an execution control decision section that decides to execute the torque vibration cancellation control in the case where it is determined that the torque vibration cancellation control can be executed and that decides to execute operation point change control, in which the drive operation point of the internal combustion engine is changed, in the case where it is determined that the torque vibration cancellation control cannot be executed, wherein:
the operation point change control is configured so as to change the drive operation point of the internal combustion engine such that the drive operation point of the internal combustion engine is changed in the direction of moving out of the reduction necessary range and such that, as the rotational speed of the internal combustion engine is changed, either: (i) an output power of the internal combustion engine remains constant, or (ii) an output torque of the internal combustion engine remains constant.

2. The control device according to claim 1, wherein:
the rotary electric machine is electrically connected to a power storage device via an inverter that performs a DC/AC conversion; and
the cancellation control execution determination section determines whether or not the torque vibration cancellation control can be executed on the basis of a state of at least one of the rotary electric machine, the power storage device, and the inverter.

3. The control device according to claim 1, wherein:
the reduction necessary range is a range prescribed using both the rotational speed and the output torque of the internal combustion engine.

4. The control device according to claim 1, wherein:
the vehicle drive device includes an automatic speed change mechanism capable of changing a speed ratio and a friction engagement device capable of adjusting a state of transfer of rotation, the automatic speed change mechanism and the friction engagement device being provided on the power transfer path; and
the operation point change control is at least one of speed ratio change control, in which the speed ratio is changed to vary the rotational speed of the internal combustion engine, and slip control, in which the friction engagement device is brought into a slip state.

5. The control device according to claim 4, wherein
the execution control decision section selects, as the operation point change control, one of the speed ratio change control and the slip control that causes a smaller reduction in energy efficiency of the vehicle drive device on the basis of the drive operation point of the internal combustion engine and the rotational speed of the output member, and decides to execute the selected control.

* * * * *